(12) United States Patent
Katayama et al.

(10) Patent No.: US 9,509,023 B2
(45) Date of Patent: Nov. 29, 2016

(54) STRUCTURE FOR SECURING BATTERY

(71) Applicant: HONDA MOTOR CO., LTD., Tokyo (JP)

(72) Inventors: Goichi Katayama, Wako (JP); Takeshi Ueda, Wako (JP); Tooru Ohgaki, Wako (JP); Arihisa Kimura, Wako (JP); Shuji Sasaki, Wako (JP); Kenji Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 14/363,052

(22) PCT Filed: Dec. 5, 2012

(86) PCT No.: PCT/JP2012/081507
§ 371 (c)(1),
(2) Date: Jun. 5, 2014

(87) PCT Pub. No.: WO2013/084937
PCT Pub. Date: Jun. 13, 2013

(65) Prior Publication Data
US 2015/0044538 A1 Feb. 12, 2015

(30) Foreign Application Priority Data

Dec. 9, 2011 (JP) ................. 2011-269832
Jan. 18, 2012 (JP) ................. 2012-007711

(51) Int. Cl.
*H01M 10/6556* (2014.01)
*H01M 2/10* (2006.01)
(Continued)

(52) U.S. Cl.
CPC ....... *H01M 10/5057* (2013.01); *H01M 2/1077* (2013.01); *H01M 10/613* (2015.04); *H01M 10/6554* (2015.04); *H01M 10/6556* (2015.04)

(58) Field of Classification Search
None
See application file for complete search history.

(56) References Cited

U.S. PATENT DOCUMENTS

| 4,151,547 A | 4/1979 | Rhoades et al. |
| 5,213,868 A | 5/1993 | Liberty et al. |
| 2011/0200862 A1* | 8/2011 | Kurosawa ........... H01M 2/1016 429/120 |

FOREIGN PATENT DOCUMENTS

| JP | 54-075664 U | 5/1979 |
| JP | 05-198709 A | 8/1993 |

(Continued)

OTHER PUBLICATIONS

Machine Translation of Japanese Patent Publication 2005-333056 published Dec. 2005.*

(Continued)

*Primary Examiner* — Patrick Ryan
*Assistant Examiner* — Wyatt McConnell
(74) *Attorney, Agent, or Firm* — Westeman, Hattori, Daniels & Adrian, LLP

(57) ABSTRACT

When a battery is supported on a cooling plate, since a heat transfer sheet, which is deformable by pressure, is held between the cooling plate and a cooling surface of the battery, it is possible to efficiently transfer the heat of the battery from the cooling surface to the cooling plate via the heat transfer sheet, thereby enhancing the effect in cooling the battery. Since the heat transfer sheet includes a plurality of through holes, compared with a case in which a heat transfer sheet does not include the through hole, the reaction force generated by restoration of the compressively deformed heat transfer sheet to its original shape is decreased, thus reducing the load acting on a mounting flange securing the battery to the cooling plate and thereby preventing the mounting flange from being broken.

9 Claims, 19 Drawing Sheets

(51) Int. Cl.
*H01M 10/6554* (2014.01)
*H01M 10/613* (2014.01)

(56) References Cited

FOREIGN PATENT DOCUMENTS

| JP | 10-254372 A | 9/1998 |
|---|---|---|
| JP | 2000-082887 A | 3/2000 |
| JP | 2004-040127 A | 2/2004 |
| JP | 2004-289063 A | 10/2004 |
| JP | 2005-235968 A | 9/2005 |
| JP | 2005-333056 A | 12/2005 |
| JP | 2006-332126 A | 12/2006 |
| JP | 2009-110832 A | 5/2009 |
| JP | 2011-034775 A | 2/2011 |
| JP | 2011-171029 A | 9/2011 |
| JP | 2011-175743 A | 9/2011 |
| WO | 2011/147547 A1 | 12/2011 |

OTHER PUBLICATIONS

Decision of Granting a Patent dated Dec. 2, 2015, issued in counterpart Japanese Patent Application No. 2013-548267. ( 3 pages).
International Search Report, dated Feb. 26, 2013, issued in corresponding application No. PCT/JP2012/081507.

* cited by examiner

STATE OF BATTERY MODULE SET ON COOLING PLATE

FIG.19
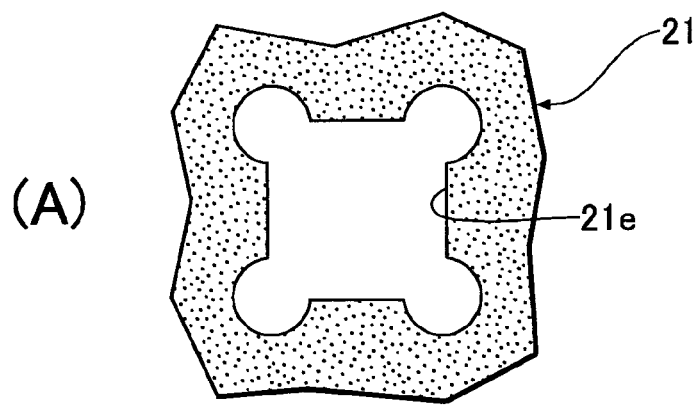
(A)
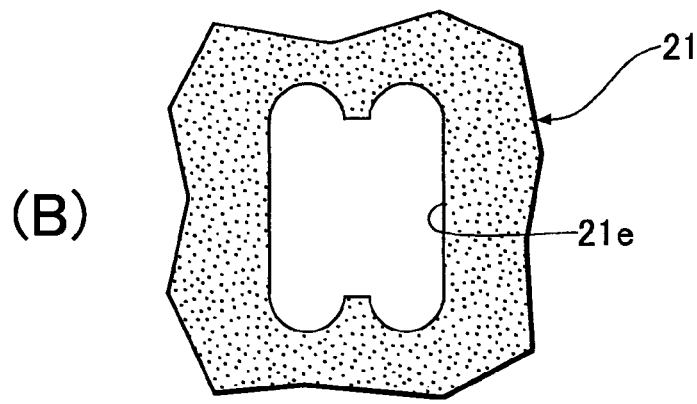
(B)
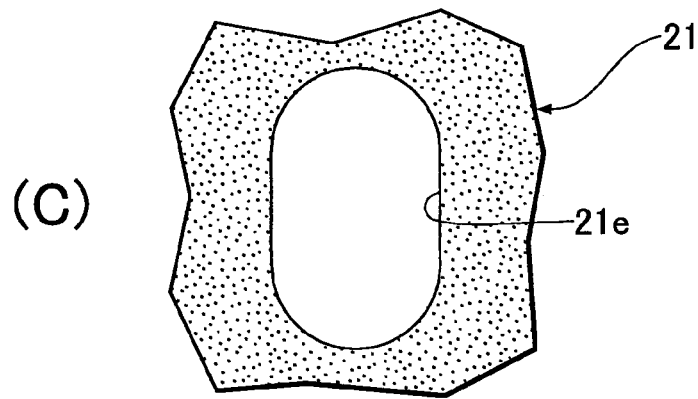
(C)

STRUCTURE FOR SECURING BATTERY

TECHNICAL FIELD

The present invention relates to a structure for securing a battery, in which a linking member provided on the battery is secured to a cooling plate in a state in which a heat transfer sheet that can be deformed by pressure is held between the cooling plate and a cooling surface of the battery.

BACKGROUND ART

When cooling is carried out by supporting a cooling surface of a battery module on a hollow cooling plate having a cooling medium flowing through its interior and transferring the heat of the battery module to the cooling plate via the cooling surface, since it is inevitable that a minute gap will occur between the cooling plate and the cooling surface of the battery module, which are both rigid, there is the problem that the performance in cooling the battery module is degraded due to inhibition of thermal conduction between the cooling surface and the cooling plate because of the gap.

In order to solve this problem, an arrangement in which a deformable heat transfer sheet having excellent thermal conductivity is held between a cooling plate and a cooling surface of a battery module and any gap between the cooling plate and the cooling surface of the battery module is eliminated by deformation of the heat transfer sheet to thus promote heat transfer from the cooling surface to the cooling plate, thereby enhancing the performance in cooling the battery module, is known from Patent Document 1 below.

RELATED ART DOCUMENTS

Patent Document

Patent Document 1: Japanese Patent Application Laid-open No. 2011-34775

SUMMARY OF THE INVENTION

Problems to be Solved by the Invention

When securing a linking member provided on the battery module to the cooling plate using a bolt, etc., if the heat transfer sheet held between the cooling surface of the battery module and the heat transfer sheet is formed from a solid plate material having a constant thickness, the battery module is urged upward (a direction in which it moves away from the cooling plate) by virtue of a large reaction force received from the compressed heat transfer sheet, and there is a possibility that the linking member provided on the battery module will be subjected to a large load and will break.

The present invention has been accomplished in light of the above circumstances, and it is an object thereof to reduce the reaction force of a heat transfer sheet held between a cooling plate and a cooling surface of a battery to thus reduce the load to which a linking member securing the battery is subjected.

Means for Solving the Problems

In order to attain the above object, according to a first aspect of the present invention, there is provided a structure for securing a battery, in which a linking member provided on a battery is secured to a cooling plate in a state in which a heat transfer sheet that can be deformed by pressure is held between the cooling plate and a cooling surface of the battery, characterized in that the heat transfer sheet comprises a recess portion on at least part of a surface thereof.

Further, according to a second aspect of the present invention, in addition to the first aspect, an outer periphery of the recess portion has a closed shape.

Furthermore, according to a third aspect of the present invention, in addition to the second aspect, the recess portion comprises a through hole extending through the heat transfer sheet, and an insulating sheet is held between the heat transfer sheet and the cooling plate.

Moreover, according to a fourth aspect of the present invention, in addition to the first aspect, the recess portion comprises a through hole extending through the heat transfer sheet, the cooling plate is hollow, the heat transfer sheet has a rectangular shape having long sides and short sides, and a gap between a plurality of the through holes disposed along the long side is larger than a gap between a plurality of the through holes disposed along the short side.

Further, according to a fifth aspect of the present invention, in addition to the fourth aspect, the plurality of through holes are disposed in a staggered manner.

Furthermore, according to a sixth aspect of the present invention, in addition to the first aspect, the recess portion forms an air vent groove extending from one end of the heat transfer sheet toward the other end.

Moreover, according to a seventh aspect of the present invention, in addition to the sixth aspect, the battery comprises a battery module in which a plurality of battery cells are stacked with a holder held therebetween, the holder comprises a projecting portion protruding from the cooling surface toward the heat transfer sheet, and the heat transfer sheet comprises a positioning recess portion into which the projecting portion is fitted.

Further, according to an eighth aspect of the present invention, in addition to the seventh aspect, the air vent groove comprises a first air vent groove opposing the cooling surface and a second air vent groove opposing the cooling plate, and the width of the first air vent groove is smaller than the width of the second air vent groove.

Furthermore, according to a ninth aspect of the present invention, in addition to any one of the sixth to eighth aspects, the battery comprises a projecting wall portion surrounding a periphery of the cooling surface and protruding toward the cooling plate.

A battery module 13 of an embodiment corresponds to the battery of the present invention, an intermediate holder 15 of the embodiment corresponds to the holder of the present invention, a mounting flange 17a of the embodiment corresponds to the linking member of the present invention, a through hole 21a of the embodiment corresponds to the recess portion of the present invention, a positioning groove 21b of the embodiment corresponds to the positioning recess portion of the present invention, and first and second air vent grooves 21c and 21d of the embodiment correspond to the recess portion or the air vent groove of the present invention.

Effects of the Invention

In accordance with the first aspect of the present invention, when the battery is secured to the cooling plate, since the heat transfer sheet, which is deformable by pressure, is held between the cooling plate and the cooling surface of the battery, it is possible, by deforming the heat transfer sheet, to prevent a gap from occurring between the cooling plate and the cooling surface of the battery, thus efficiently transferring the heat of the battery from the cooling surface to the cooling plate via the heat transfer sheet and thereby enhancing the effect in cooling the battery. Since the heat transfer sheet includes the recess portion on at least part of the surface, compared with a case in which a heat transfer sheet does not include a recess portion, the reaction force generated by restoration of the compressively deformed heat transfer sheet to its original shape is decreased, thus reducing the load acting on the linking member securing the battery to the cooling plate and thereby preventing the linking member from being broken.

Furthermore, in accordance with the second aspect of the present invention, since the recess portions of the heat transfer sheet have a closed shape, condensed water is retained in each recess portion and is isolated from condensed water retained in its adjacent recess portion, thus preventing a ground fault from occurring due to condensed water giving continuity of connection.

Moreover, in accordance with the third aspect of the present invention, if the recess portion is formed from a through hole extending through the heat transfer sheet, there is a possibility that condensed water would reach the cooling plate via the through hole to thus generate a ground fault, but since the insulating sheet is held between the heat transfer sheet and the cooling plate, it is possible to prevent generation of a ground fault by providing shielding from condensed water by means of the insulating sheet.

Furthermore, in accordance with the fourth aspect of the present invention, since the recess portion of the heat transfer sheet is formed from the through hole, and the gap between the plurality of through holes disposed along the long side of the rectangular heat transfer sheet is made larger than the gap between the plurality of through holes disposed along the short side, even if the heat transfer sheet is strongly stretched along the long side when the hollow cooling plate flexes downwardly due to the weight of the battery, it is possible, by increasing the strength in the long side direction of the heat transfer sheet in which the gap between the plurality of through holes is set so as to be large, to prevent the heat transfer sheet from breaking.

Moreover, in accordance with the fifth aspect of the present invention, since the plurality of through holes are disposed in a staggered manner, it is possible to increase the number of through holes without degrading the strength of the heat transfer sheet, thus decreasing the reaction force of the heat transfer sheet.

Furthermore, in accordance with the sixth aspect of the present invention, since the recess portion of the heat transfer sheet forms the air vent groove that connects one end side of the heat transfer sheet to the other end side, when the heat transfer sheet is superimposed on the cooling plate or the cooling surface of the battery, air trapped between the two can be discharged via the air vent groove of the heat transfer sheet, thus putting the heat transfer sheet in intimate contact with the cooling plate or the cooling surface of the battery and thereby enhancing the thermal conductivity.

Moreover, in accordance with the seventh aspect of the present invention, the battery includes the battery module in which the plurality of battery cells are stacked with the holders held therebetween, and the holder held between adjacent battery cells includes the projecting portion protruding from the cooling surface of the battery toward the heat transfer sheet side. Since the heat transfer sheet includes the positioning recess portion, into which the projecting portion of the holder is fitted, when the heat transfer sheet is positioned with respect to the cooling surface of the battery module, it is possible to enhance the precision of positioning by fitting the projecting portion into the recess portion.

Furthermore, in accordance with the eighth aspect of the present invention, the contact area between the heat transfer sheet and the cooling surface of the battery is smaller than the contact area between the heat transfer sheet and the cooling plate only by a portion corresponding to the area of the holder that is in contact with the heat transfer sheet. Since among the first and second air vent grooves of the heat transfer sheet, the width of the first air vent groove opposing the cooling surface of the battery is smaller than the width of the second air vent groove opposing the cooling plate, the difference in contact area is compensated for by the difference in width between the first and second air vent grooves, thus making the amount of heat transfer from the cooling surface of the battery to the heat transfer sheet and the amount of heat transfer from the heat transfer sheet to the cooling plate uniform and thereby enhancing the effect in cooling the battery.

Moreover, in accordance with the ninth aspect of the present invention, since the battery includes the projecting wall portion surrounding the periphery of the cooling surface and protruding toward the cooling plate, even if the heat transfer sheet held between the cooling surface of the battery and the cooling plate is deformed and spreads outwardly, not only is it possible by means of the projecting wall portion to prevent the heat transfer sheet from protruding outwardly from the cooling surface, but it is also possible, by actively deforming the heat transfer sheet inwardly, to squash the air vent groove and increase the area of the heat transfer sheet that is in contact with the cooling surface of the battery or the cooling plate, thereby further enhancing the thermal conductivity.

BRIEF DESCRIPTION OF DRAWINGS

FIG. 19 is a diagram showing another embodiment of a positioning hole. (fifth to seventh embodiments)

EXPLANATION OF REFERENCE NUMERALS AND SYMBOLS

Figure 1:
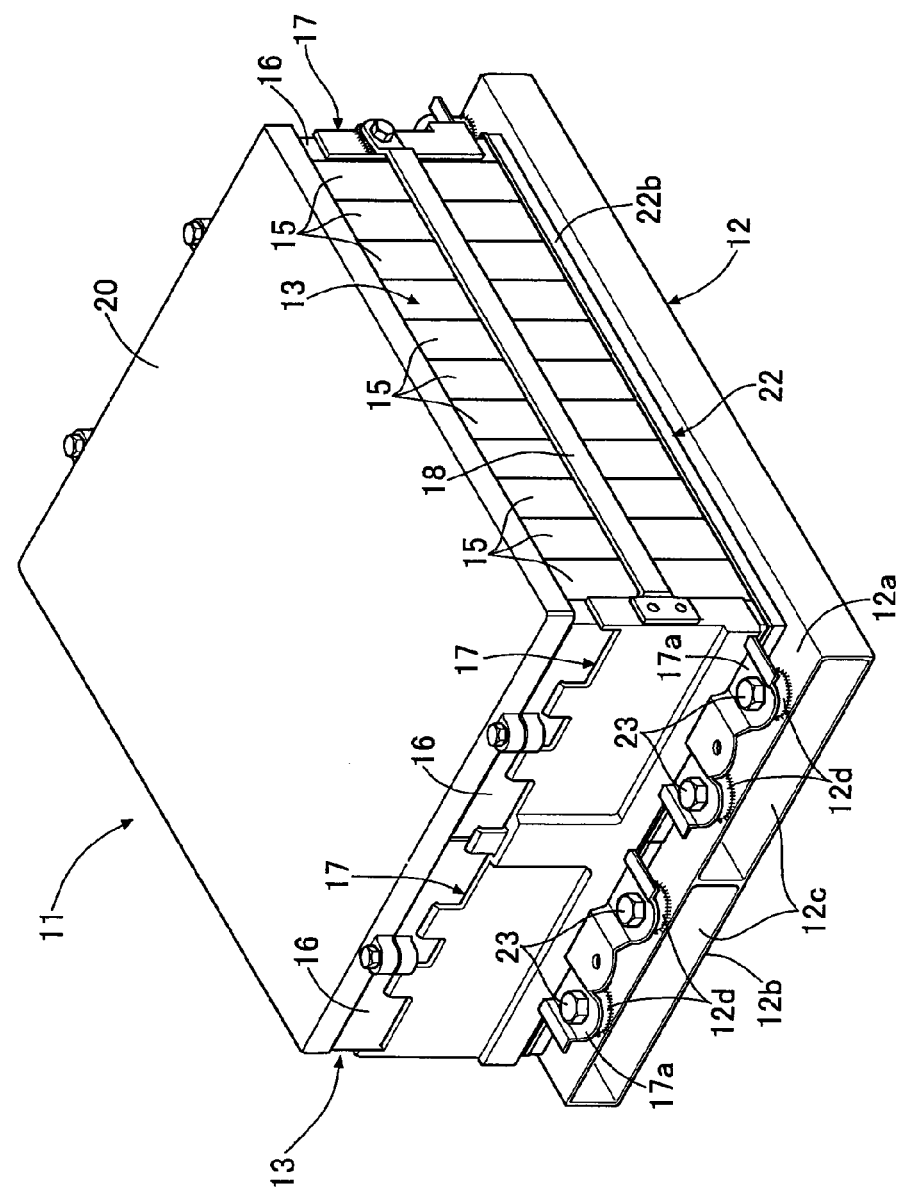
FIG. 1 is a perspective view of a battery module. (first embodiment)

12 Cooling plate
13 Battery module (battery)
14 Battery cell
14a Cooling surface
15 Intermediate holder (holder)
15c Lower flange (projecting portion)
15d Projecting wall portion
16c Projecting wall portion
17a Mounting flange (linking member)
21 Heat transfer sheet
21a Through hole (recess portion)
21b Positioning groove (positioning recess portion)
21c First air vent groove (recess portion, air vent groove)
21d Second air vent groove (recess portion, air vent groove)
22 Insulating sheet

MODES FOR CARRYING OUT THE INVENTION

Modes for carrying out the present invention are explained by reference to the attached drawings.

First Embodiment

A first embodiment of the present invention is now explained by reference to FIG. 1 to FIG. 6.

Figure 2:
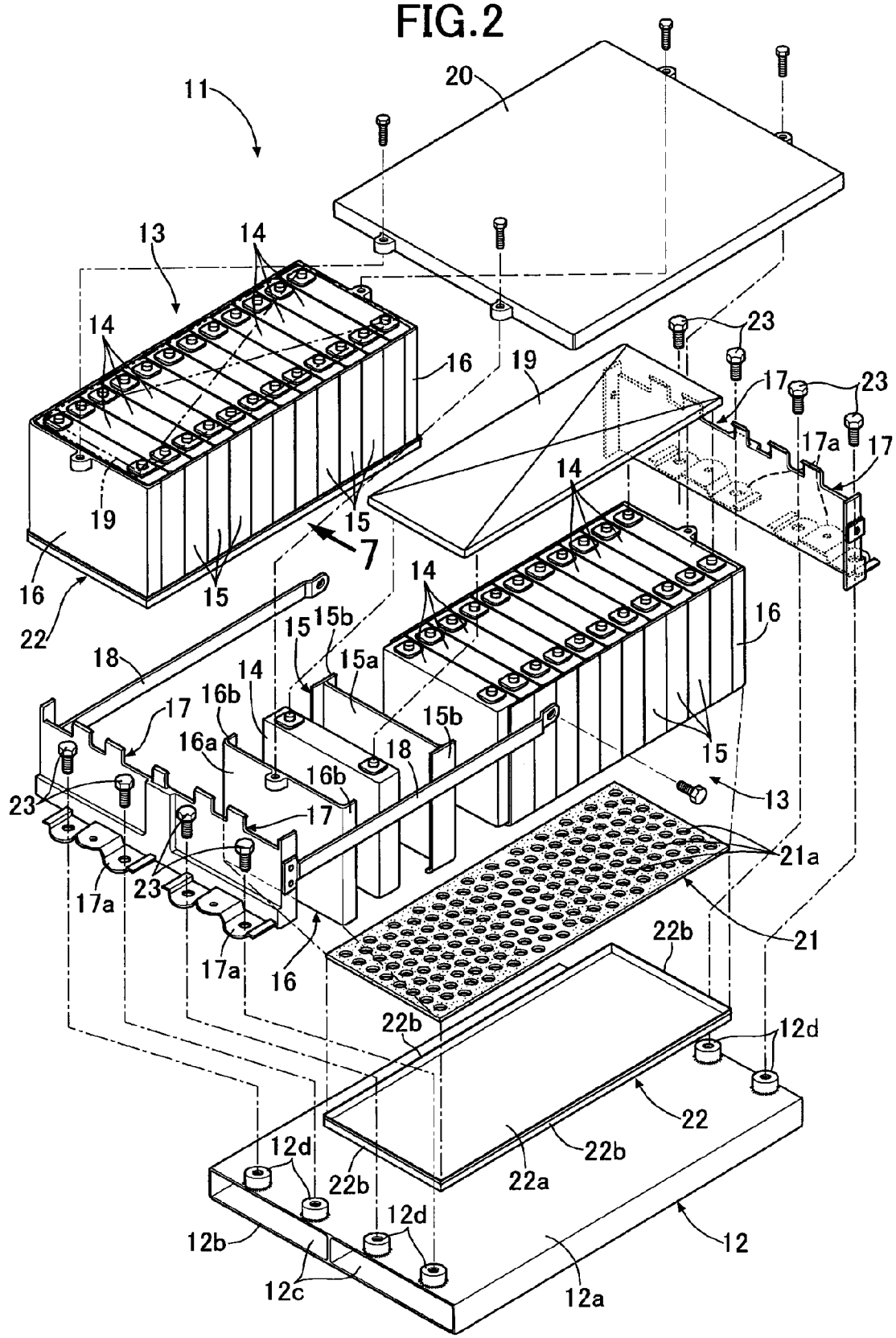
FIG. 2 is an exploded perspective view of the battery module. (first embodiment)

As shown in FIG. 1 and FIG. 2, a battery pack 11 mounted on an electric automobile is formed by supporting a plurality of battery modules 13 on a cooling plate 12; FIG. 1 and FIG. 2 show part of the cooling plate 12 and two battery modules 13 and 13. In the present embodiment, the two battery modules 13 and 13 are integrated, but the structures of the battery modules 13 are substantially identical.

The battery module 13 is formed by stacking a plurality (12 in the embodiment) of battery cells 14 each having a rectangular shape with synthetic resin intermediate holders 15 held therebetween and by stacking synthetic resin end holders 16 and 16 on outer sides of two battery cells 14 and 14 positioned at opposite ends in the stacking direction.

The intermediate holder 15, whose horizontal cross section is formed into an H-shape, includes a plate-shaped holder main body portion 15a held between two adjacent battery cells 14 and 14, and a pair of side flanges 15b and 15b protruding toward opposite sides in the stacking direction from left and right edges of the holder main body portion 15a. Due to the side flanges 15b of adjacent intermediate holders 15 meshing with each other, the positional relationship between the intermediate holders 15 is restricted, resulting in restriction of the positional relationship between the plurality of battery cells 14.

The end holder 16, whose horizontal cross section is formed into a squared U-shape, includes a plate-shaped holder main body portion 16a abutting against an outer face of the battery cell 14 positioned at the outer end in the stacking direction and a pair of side flanges 16b and 16b protruding inwardly in the stacking direction from left and right edges of the holder main body portion 16a. Due to the side flanges 16b and 16b meshing with the side flanges 15b and 15b of the adjacent intermediate holder 15, the positional relationship between all of the intermediate holders 15 and the end holders 16 and 16 is restricted.

A pair of end plates 17 and 17 are superimposed on outer faces, in the stacking direction, of the pair of end holders 16 and 16 of each battery module 13, and twelve battery cells 14, eleven intermediate holders 15, and two end holders 16 and 16 are tightly integrated by fastening the pair of end plates 17 and 17 by means of a fastening band 18. Two fastening bands 18 and 18 are shared between two battery modules 13 and 13. Abutting faces of the battery cells 14, intermediate holders 15, and end holders 16 and 16 are secured by means of an adhesive.

A bus bar plate 19 retaining a plurality of bus bars, which are not illustrated, is fixed to an upper face of the battery module 13, and terminals of the battery cells 14 are electrically connected by means of the bus bar plate 19. Upper faces of the two battery modules 13 and 13 arranged side by side are covered by a common synthetic resin cover 20.

Lower faces of the twelve battery cells 14 forming the battery module 13, that is, lower faces of the battery modules 13, form cooling surfaces 14a (see FIG. 3 to FIG. 5) opposing an upper face of the cooling plate 12, and one rectangular heat transfer sheet 21 is held between these cooling surfaces 14a and an upper face of the cooling plate 12. The material for the heat transfer sheet 21 is a synthetic resin having excellent thermal conductivity (for example, a silicone rubber), and can be squashed and deformed when pressure is applied.

An insulating sheet 22 is disposed between a lower face of the heat transfer sheet 21 and the upper face of the cooling plate 12. The insulating sheet 22 is made of a synthetic resin, such as PP (polypropylene) or PPS (polyphenylene sulfide), that is nonconductive and water repellent and is formed into a shallow tray shape having a bottom wall portion 22a and side wall portions 22b rising therefrom, a lower part of the battery module 13 being fitted into the interior. Therefore, the upper face of the heat transfer sheet 21 abuts against the cooling surfaces 14 of the battery cells 14, and the lower face of the heat transfer sheet 21 abuts against the upper face of the insulating sheet 22. Since the insulating sheet 22 has a very small thickness, there is almost no interference with heat transfer.

The cooling plate 12 is a metallic hollow member having excellent thermal conductivity, and a cooling medium passage 12c for a cooling medium (for example, cooling air) to flow is defined between an upper wall portion 12a and a lower wall portion 12b. Cooling air that has been sucked in by means of a cooling fan, which is not illustrated, flows through the cooling medium passage 12c of the cooling plate 12, and carries out heat exchange with heat that has been transferred from the cooling surfaces 14a of the battery cells 14 to the upper wall portion 12a via the heat transfer sheet 21 and the insulating sheet 22, thus cooling the battery cells 14.

Figure 3:
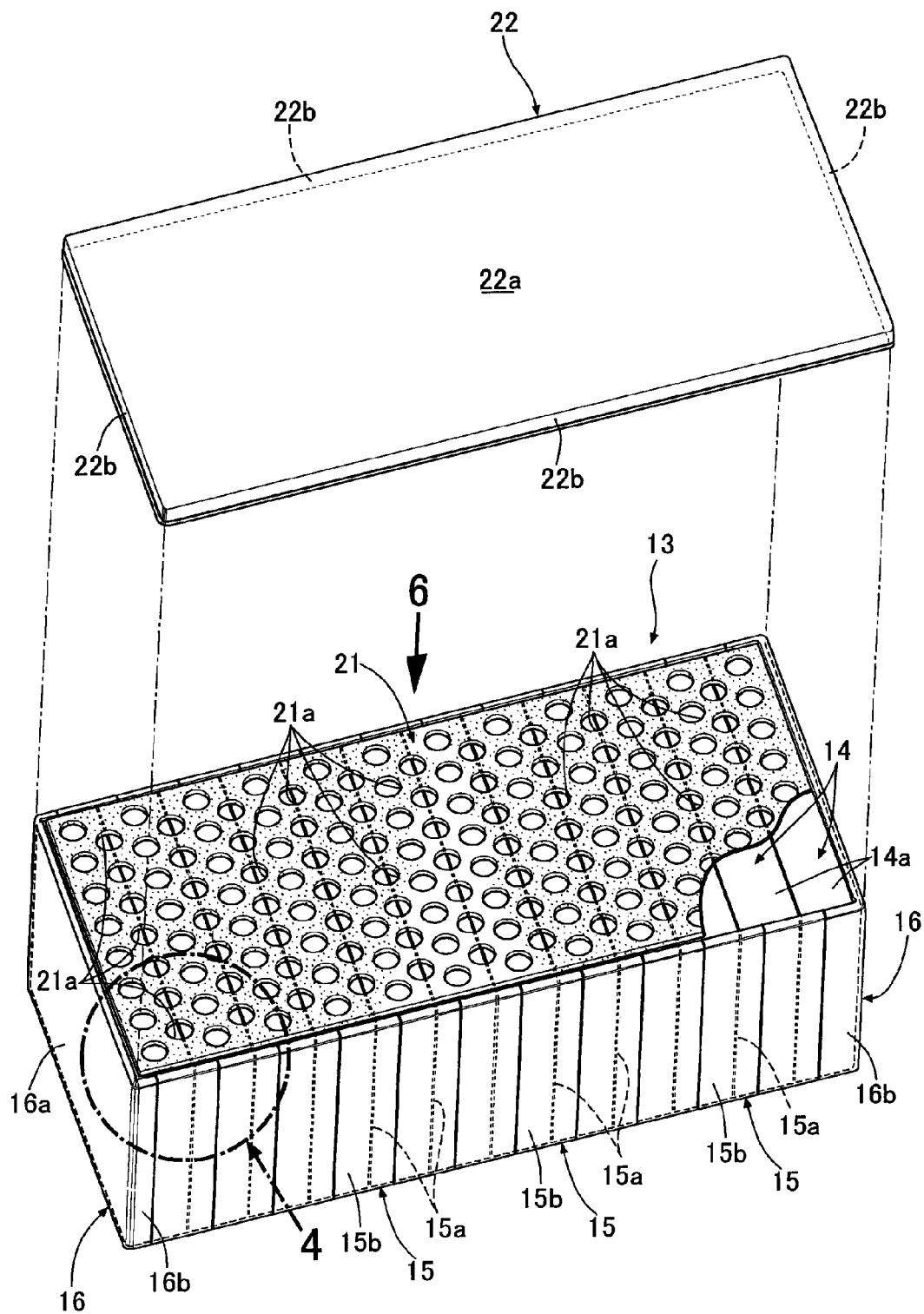
FIG. 3 is a perspective view of the battery module in an upside down state. (first embodiment)
Figure 4:
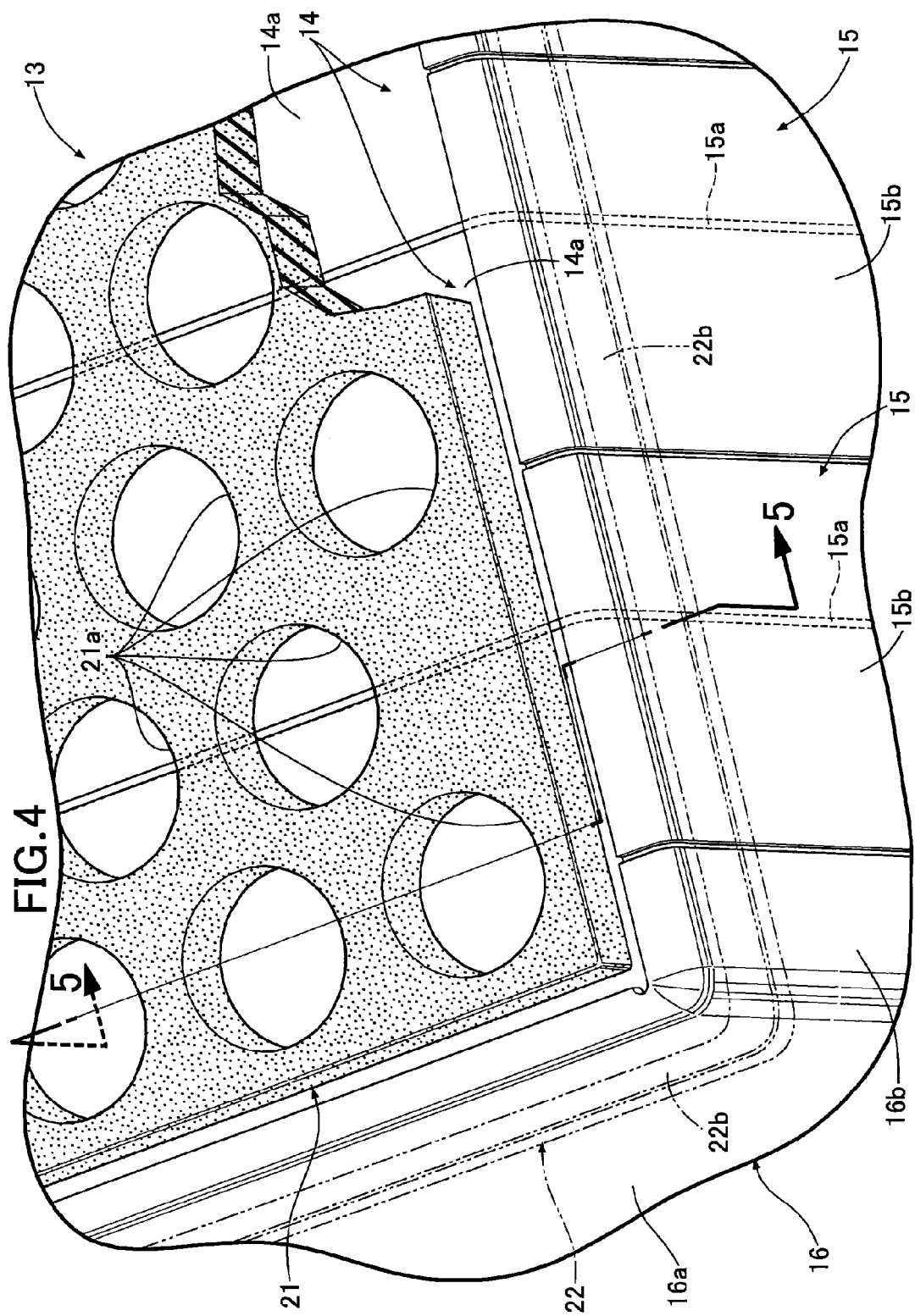
FIG. 4 is an enlarged view of part 4 in FIG. 3. (first embodiment)
Figure 5:
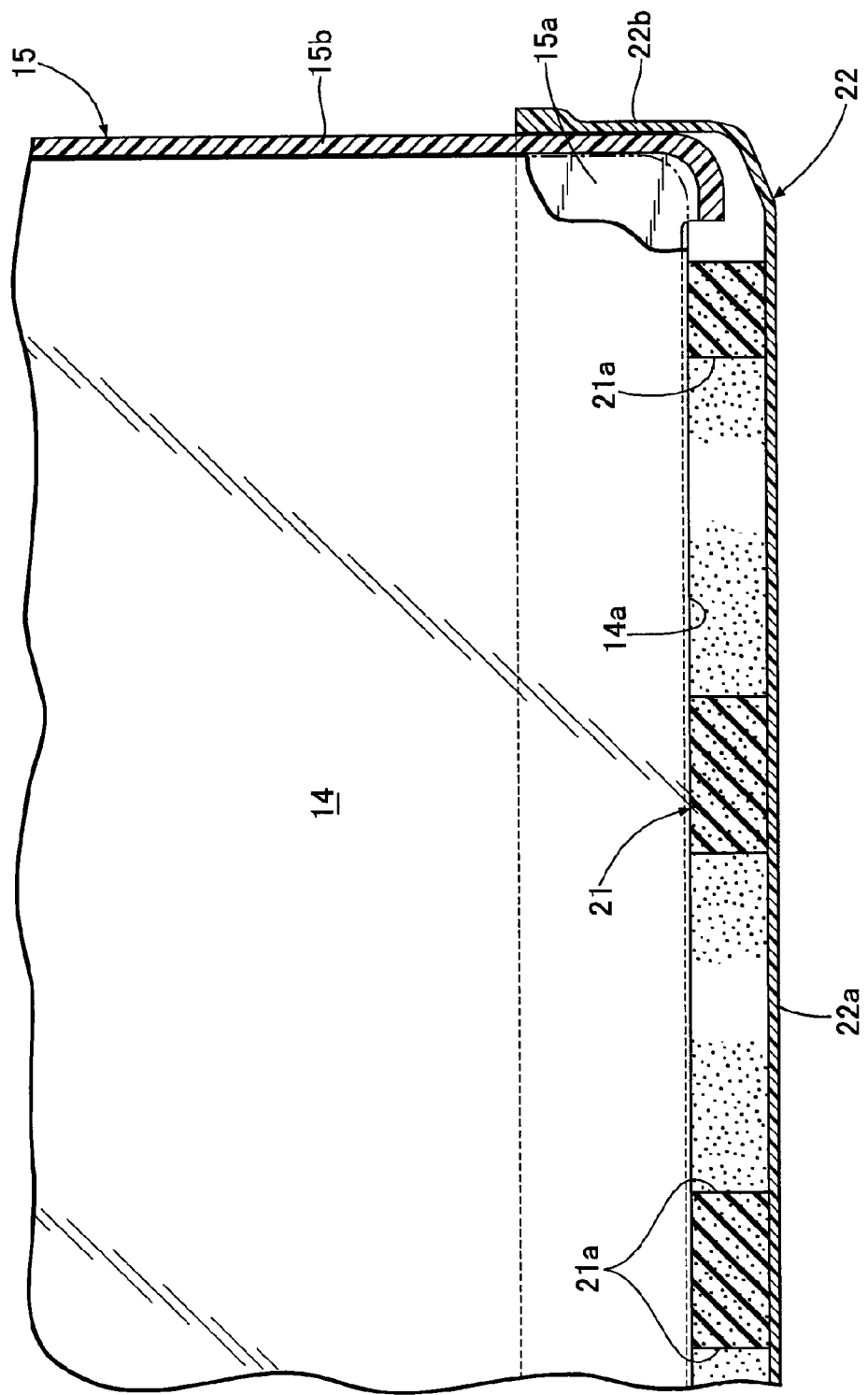
FIG. 5 is a sectional view along line 5-5 in FIG. 4. (first embodiment)
Figure 6:
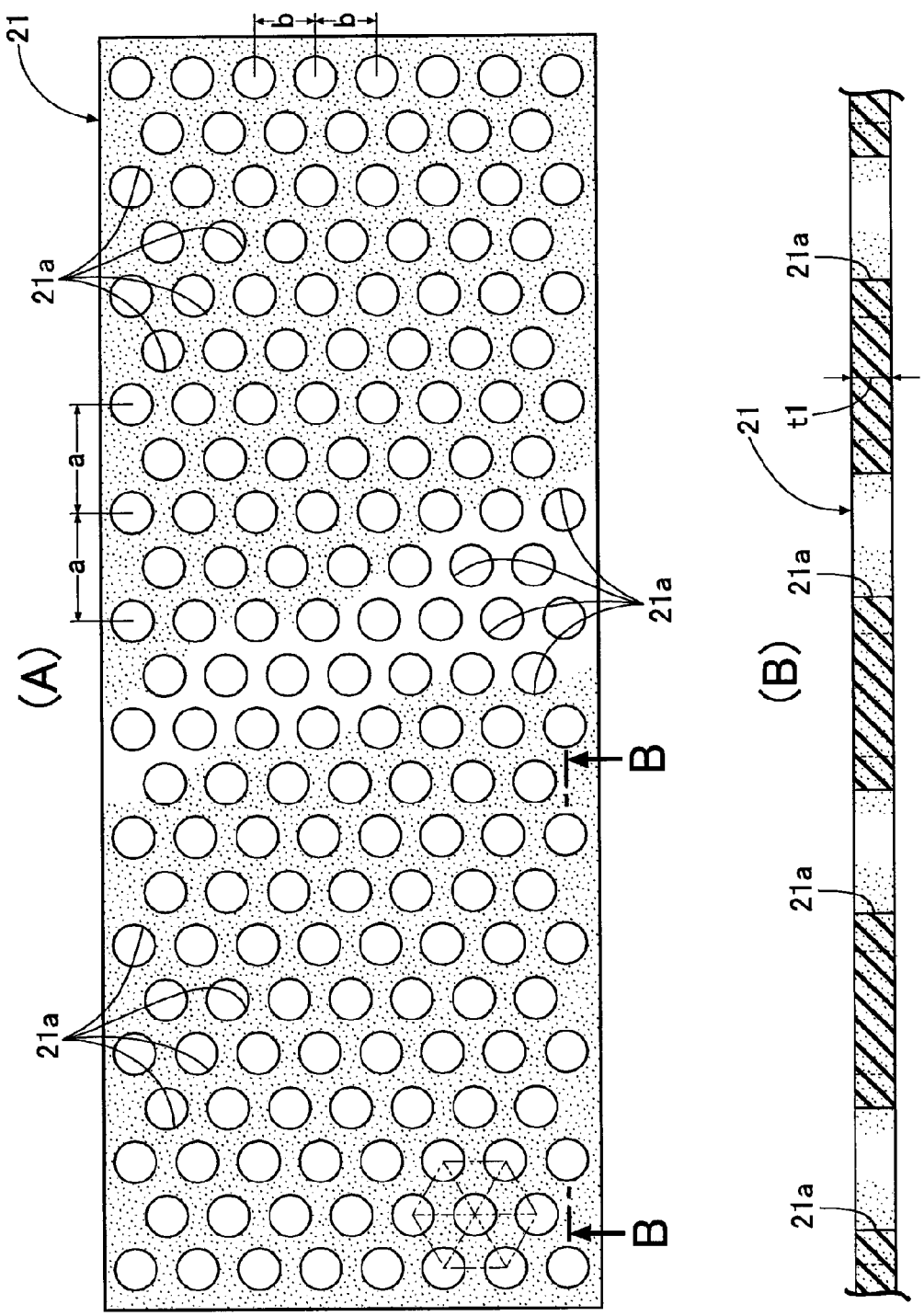
FIG. 6 is a view in the direction of arrow 6 in FIG. 3. (first embodiment)

As shown in FIG. 3 and FIG. 6, the heat transfer sheet 21 is a rectangular sheet having a long side along the stacking direction of the battery cells 14 and a short side along the direction perpendicular thereto with a basically constant thickness t1 (for example, 3 mm), and a large number of circular recess portions, that is, through holes 21a, are formed therein in a staggered manner. Furthermore, the pitch at which the through holes 21a are arranged along the long side of the heat transfer sheet 21 is a, and the pitch at which the through holes 21a are arranged along the short side is b, which is smaller than a. The proportion of the area of the through holes 21a relative to the entire area of the heat transfer sheet 21 is for example 38 percent.

As shown in FIG. 1 and FIG. 2, after assembly of the two integrated battery modules 13 and 13 is completed, the heat transfer sheet 21 is fitted onto the cooling surfaces 14a of the battery cells 14 of each of the battery modules 13, and is covered by the tray-shaped insulating sheet 22. The battery modules 13 and 13 are placed on the upper wall portion 12a of the cooling plate 12 and fastened to mounting bosses 12d of the cooling plate 12 by means of bolts 23 extending through mounting flanges 17a of the end plates 17, thereby securing the two integrated battery modules 13 and 13 to the cooling plate 12.

The operation of the embodiment of the present invention having the above arrangement is now explained.

In a state in which the battery module 13 is secured to the cooling plate 12, the heat transfer sheet 21 and the insulating sheet 22 are held between the upper wall portion 12a of the cooling plate 12 and the cooling surfaces 14a of the plurality of battery cells 14 of the battery module 13. In this arrangement, due to the weight of the battery module 13 acting on the heat transfer sheet 21, the heat transfer sheet 21 is compressed and squashed in the vertical direction, the gap between the upper face of the heat transfer sheet 21 and the cooling surfaces 14a of the battery module 13 and the gap between the lower face of the heat transfer sheet 21 and the upper wall portion 12a of the cooling plate 12 are eliminated, and heat transfer from the battery module 13 to the cooling plate 12 is carried out efficiency, thereby improving the cooling performance of the battery module 13.

Although the bottom wall portion 22a of the insulating sheet 22 is present between the lower face of the heat transfer sheet 21 and the upper wall portion 12a of the cooling plate 12, since the insulating sheet 22 is made of a very thin synthetic resin and can easily be deformed, a gap that interferes with heat transfer due to the presence of the insulating sheet 22 will not occur.

In a state in which the battery module 13 is secured to the cooling plate 12 and the heat transfer sheet 21 is compressed, the battery module 13 is urged in a direction in which it is moved away from the cooling plate 12 by means of a reaction force generated by restoration of the compressed heat transfer sheet 21 to its original shape. As a result, a large load is applied to the mounting flanges 17a of the end plates 17 of the battery module 13, and there is a possibility that the mounting flanges 17a will be broken by vibration of a vehicle body, etc.

However, in accordance with the present embodiment, since the heat transfer sheet 21 includes the large number of through holes 21a, it can easily be compressed, and the reaction force restoring it to its original shape decreases to thus decrease the load acting on the mounting flanges 17a of the end plates 17, thus preventing the mounting flanges 17a from being broken.

Furthermore, the battery cells 14 increase in temperature as a result of charging and discharging and decrease in temperature when charging and discharging stop, and water in the air condenses accompanying the decrease in temperature and becomes attached to the surface of the battery module 13. This condensed water flows downwardly by virtue of gravity, and when it reaches the cooling plate 12, there is a possibility of a ground fault in which an electrode of the battery cells 14 is electrically connected to the cooling plate 12.

However, in accordance with the present embodiment, since each through hole 21a of the heat transfer sheet 21 disposed beneath the battery module 13 has a circular shape having a closed outer periphery, condensed water is present in an isolated state in the interior of each through hole 21a, thus preventing it from being connected to condensed water of adjacent through holes 21a and thereby reliably preventing a ground fault between the battery cells 14 and the cooling plate 12.

Moreover, since the insulating sheet 22 disposed beneath the heat transfer sheet 21 is formed into a tray shape, which includes the side wall portions 22b rising from the outer periphery of the bottom wall portion 22a, it is possible to retain condensed water in the interior thereof to thus prevent it from flowing out onto the cooling plate 12, thereby more reliably preventing the occurrence of a ground fault. Furthermore, since the insulating sheet 22 is formed from a material with water repellency, condensed water attached to its surface turns into isolated water droplets, thereby preventing further effectively an electrical connection between the battery module 13 and the cooling plate 12.

Since the cooling plate 12 is a hollow member having defined in its interior the cooling medium passage 12c, when the weight of the battery module 13 is applied thereto, it deforms so that the upper wall portion 12a flexes into a downward arc shape, and the heat transfer sheet 21 deforms so as to stretch accompanying deformation of the cooling plate 12. In this process, since the amount of deformation along the long side of the rectangular heat transfer sheet 21 is larger than the amount of deformation along the short side, there is the problem that the heat transfer sheet 21 might easily break via the edge on the long side.

However, in accordance with the present embodiment, since the pitch a at which the through holes 21a along the long side of the heat transfer sheet 21 are arranged is larger than the pitch b at which the through holes 21a along the short side are arranged, the strength along the long side of the heat transfer sheet 21 is larger than the strength along the short side, thus preventing effectively breakage via the edge of the long side of the heat transfer sheet 21.

Furthermore, since the through holes 21a of the heat transfer sheet 21 are disposed in a staggered manner, compared with a case in which they are disposed in a grid shape, it is possible to ensure a large maximum width for a portion encompassed by adjacent through holes 21a and 21a to thus maintain the strength of the heat transfer sheet 21 and at the same time tightly dispose the through holes 21a to thus further reduce the reaction force of the heat transfer sheet 21.

Second Embodiment

Figure 7:
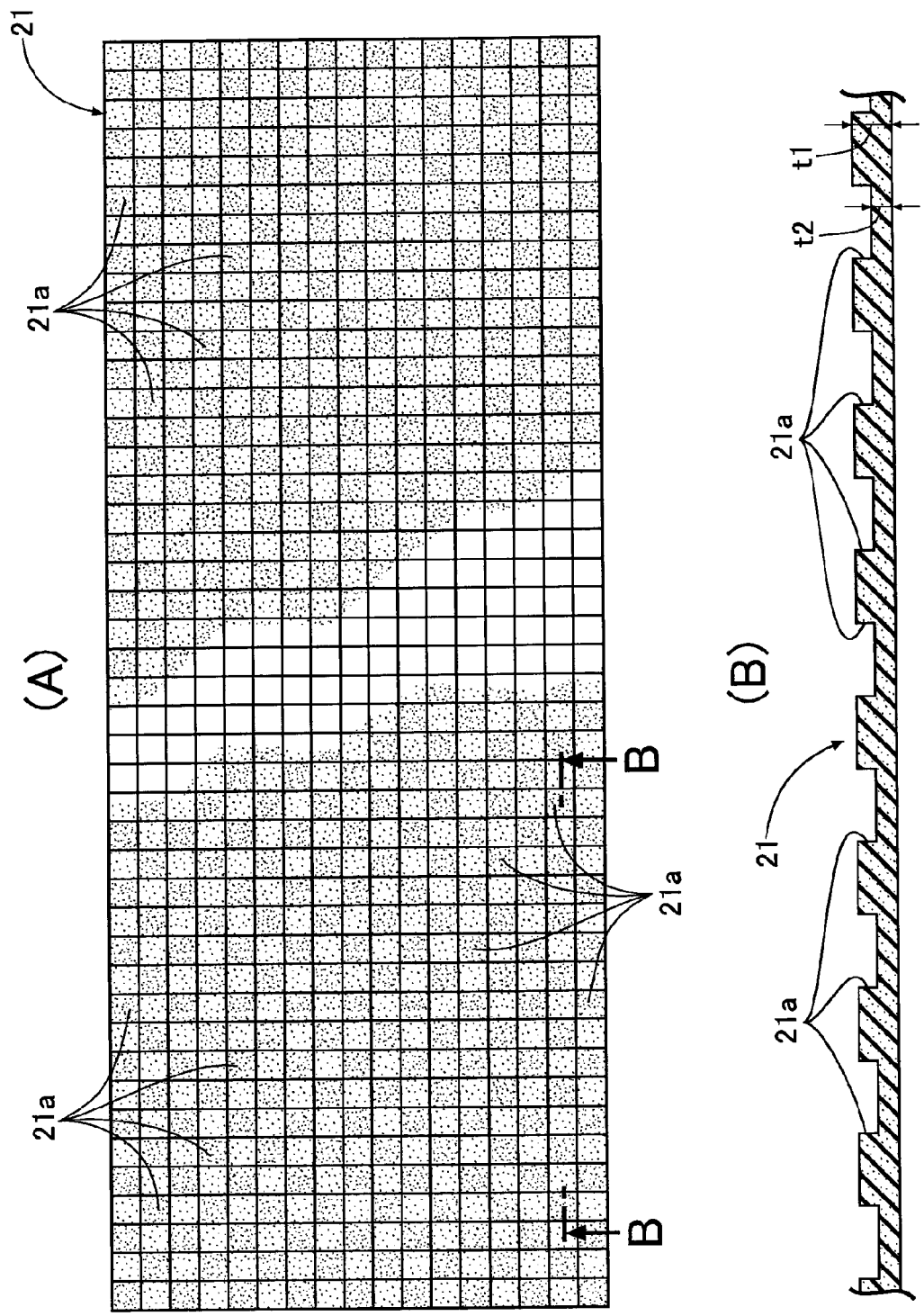
FIG. 7 is a view corresponding to FIG. 6. (second embodiment)

A second embodiment of the present invention is now explained by reference to FIG. 7.

A heat transfer sheet 21 of the second embodiment is formed so as to have a flat lower face that is in contact with an insulating sheet 22, and a large number of recess portions 21a are disposed in a checkerboard pattern on an upper face that is in contact with cooling surfaces 14a of battery cells 14. The thickness of the heat transfer sheet 21 is basically t1, but the thickness of a part where the recess portions 21a is present is t2, which is smaller than t1.

In accordance with this embodiment also, since the heat transfer sheet 21 includes a large number of recess portions 21a, the reaction force generated by restoration of the compressed heat transfer sheet 21 to its original shape decreases, thus decreasing the load acting on mounting flanges 17a of end plates 17 and thereby preventing the mounting flanges 17a from being broken.

Furthermore, since each recess portion 21a of the heat transfer sheet 21 has a shape having a closed outer periphery and is isolated, and a bottom part of each recess portion 21a is a closed in the manner of a container, condensed water is present in an isolated state in the interior of each recess portion 21a and is prevented from making contact with condensed water in adjacent recess portions 21a, thus reliably preventing a ground fault between the battery cells 14 and a cooling plate 12.

Third Embodiment

Figure 8:
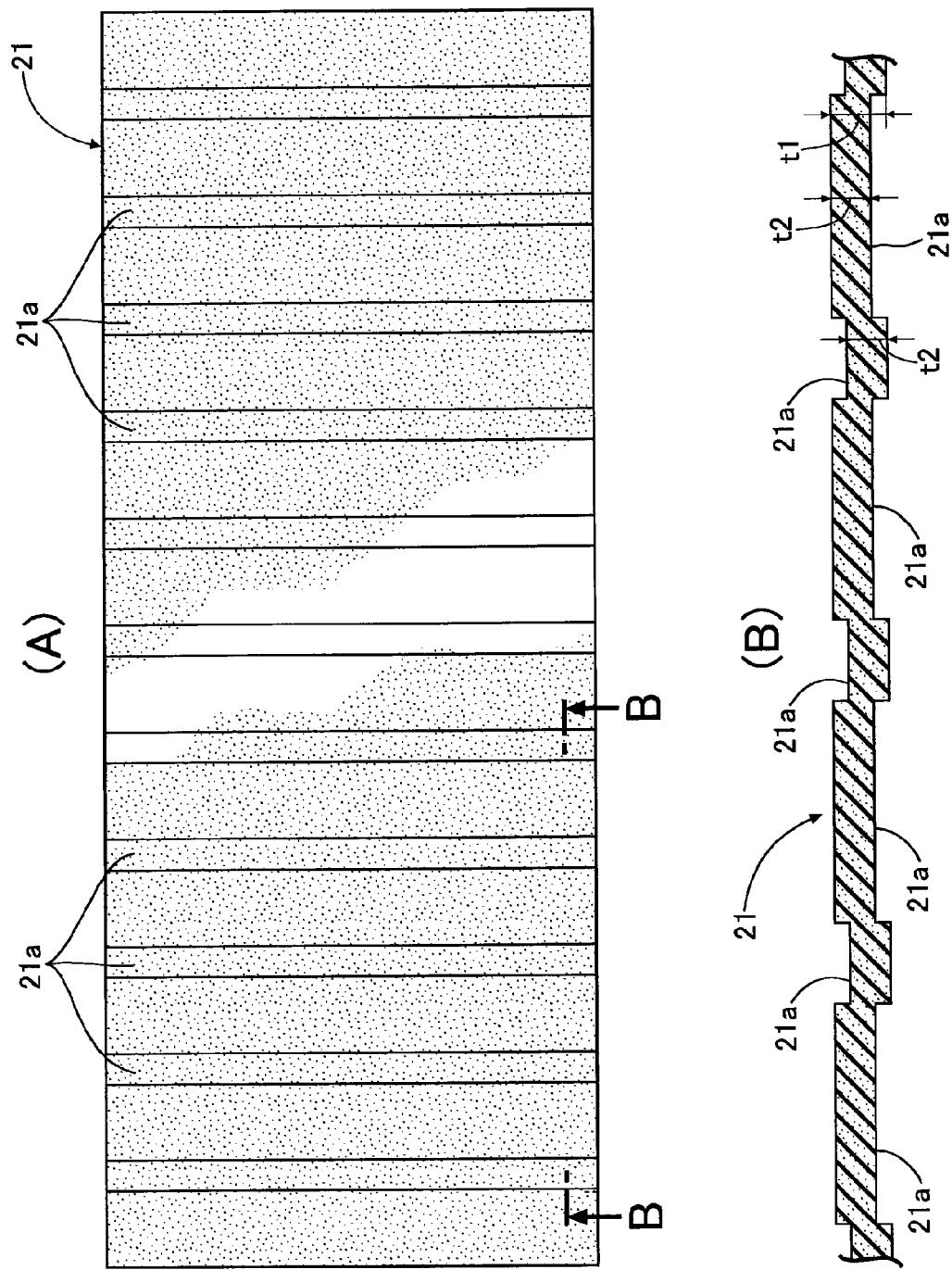
FIG. 8 is a view corresponding to FIG. 6. (third embodiment)

A third embodiment of the present invention is now explained by reference to FIG. 8.

A heat transfer sheet 21 of the third embodiment has a plurality of band-shaped recess portions 21a formed in parallel on a lower face that is in contact with an insulating sheet 22 and also has a plurality of band-shaped recess portions 21a formed in parallel on an upper face that is in contact with cooling surfaces 14a of battery cells 14 at positions offset from the recess portions 21a on the lower face. Although the maximum thickness between the upper face and the lower face of the heat transfer sheet 21 is t1, the effective thickness decreases to t2, which is smaller than t1, due to the recess portions 21a being formed.

In accordance with this embodiment also, since the heat transfer sheet 21 includes a large number of recess portions 21a, the reaction force due to restoration of the compressed heat transfer sheet 21 to its original shape decreases, the load acting on mounting flanges 17a of end plates 17 is thereby decreased, and the mounting flanges 17a are prevented from being broken.

Fourth Embodiment

A fourth embodiment of the present invention is now explained by reference to FIG. 9 to FIG. 18.

Figure 9:
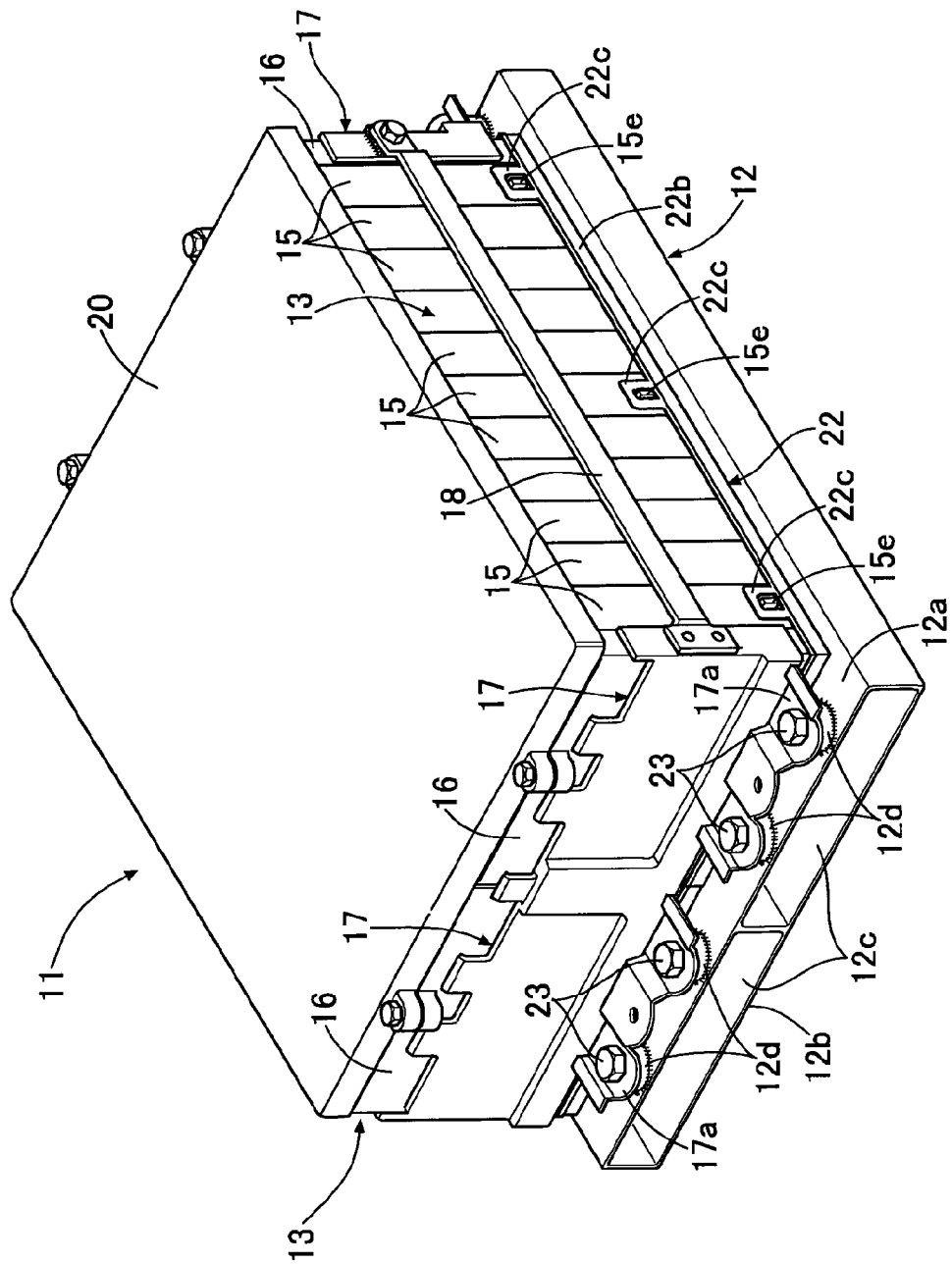
FIG. 9 is a perspective view of a battery module. (fourth embodiment)
Figure 10:
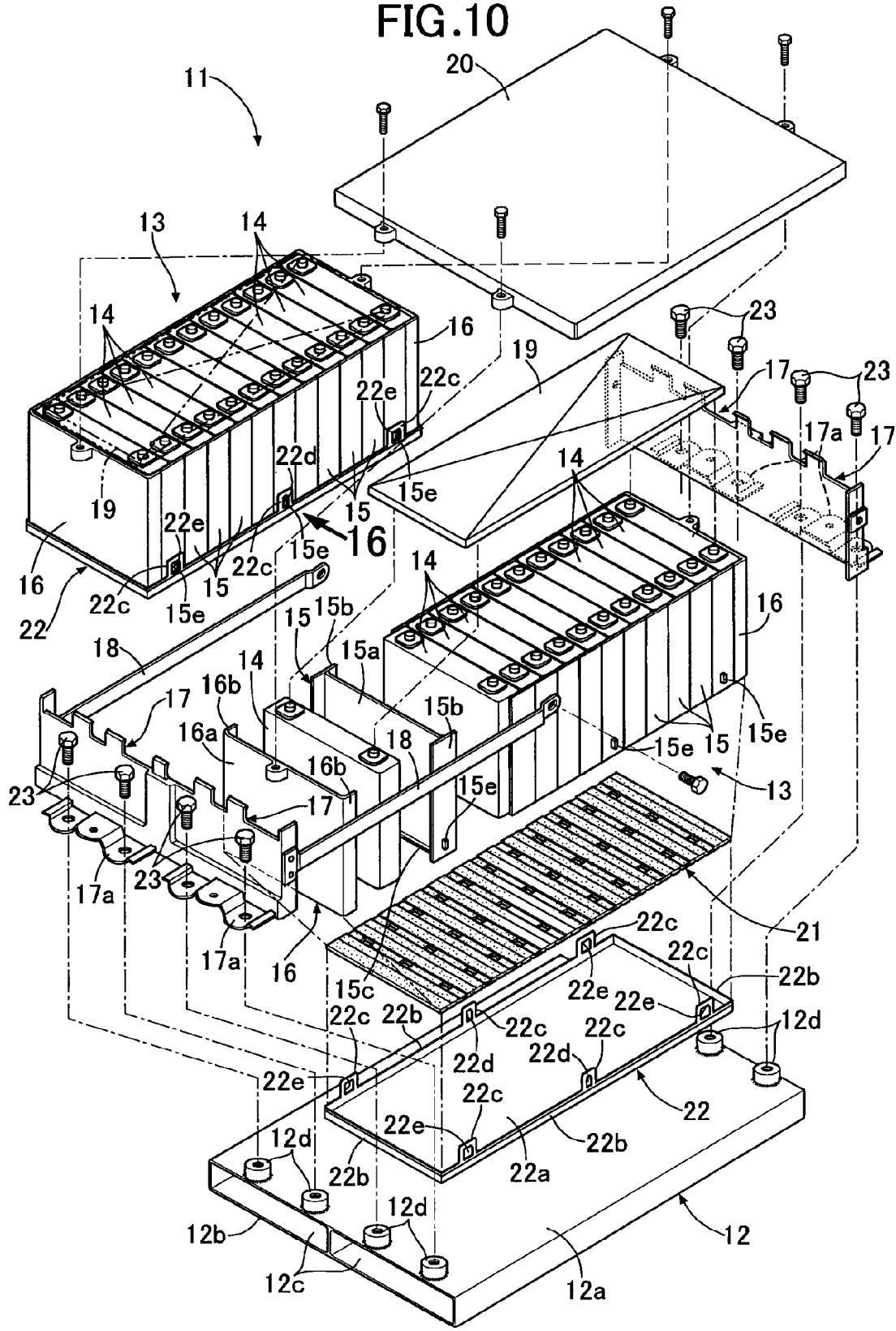
FIG. 10 is an exploded perspective view of the battery module. (fourth embodiment)

As shown in FIG. 9 and FIG. 10, a battery pack 11 of the present embodiment has different structures for an intermediate holder 15, a heat transfer sheet 21, and an insulating sheet 22 from those of the battery pack 11 (see FIG. 1 and FIG. 2) of the first embodiment. Furthermore, the surface of the heat transfer sheet 21 of the present embodiment has sticky characteristics (tackiness).

As shown in FIG. 11 to FIG. 14, the intermediate holder 15, whose horizontal cross section is formed into an H-shape, includes a plate-shaped holder main body portion 15a held between two adjacent battery cells 14 and 14, a pair of side flanges 15b and 15b protruding from left and right edges of the holder main body portion 15a toward opposite sides in the stacking direction, and a lower flange 15c protruding from the lower edge of the holder main body portion 15a toward opposite sides in the stacking direction. Due to the side flanges 15b of the adjacent intermediate holders 15 meshing with each other, the positional relationship between the intermediate holders 15 is restricted, and as a result the positional relationship between a plurality of the battery cells 14 is restricted. The width of the lower flange 15c is smaller than the width of the side flanges 15b and 15b, and even in a state in which the side flanges 15b of adjacent intermediate holders 15 are meshed with each other the lower flanges 15c do not mesh with each other, a lower face (a cooling surface 14a, which is described later) of the battery cells 14 being exposed between the lower flanges 15c.

Figure 15:
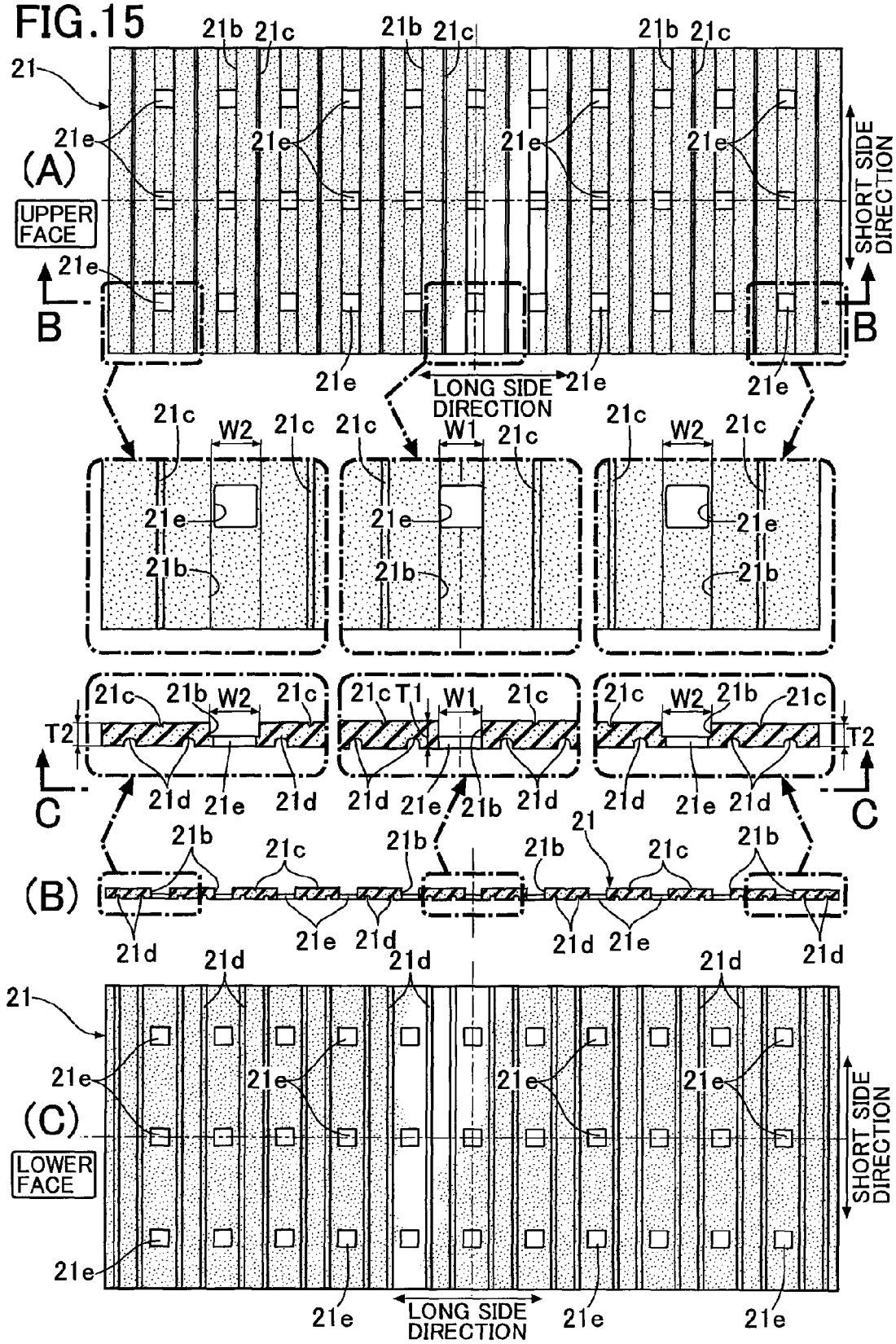
FIG. 15 is a diagram showing the shape of a heat transfer sheet. (fourth embodiment)

As shown in FIG. 15, the heat transfer sheet 21 is a rectangular sheet having its long side along the direction in which the battery cells 14 are stacked and having its short side along a direction perpendicular thereto, the thickness being constant along the short side but not constant along the long side. That is, with regard to the heat transfer sheet 21, a thickness T1 of a middle part in the long side direction is large (for example, 4.1 mm), a thickness T2 of opposite end parts in the long side direction is small (for example, 3.1 mm), and the thickness changes continuously between these parts.

Furthermore, in the heat transfer sheet 21, a total of twenty-two positioning holes 21e are formed along the long side direction as two rows. Two of the positioning holes 21e and 21e oppose a lower face of each of the lower flanges 15c of the intermediate holders 15 sandwiched between pairs of adjacent battery cells 14 and 14. The shape of the positioning hole 21e is a square, but the corners are rounded. The width of the lower flange 15c is smaller than the width of the positioning holes 21e and 21e, and it is therefore possible to view opposite edges of the lower flange 15c through the positioning holes 21e and 21e.

Formed on the upper face of the heat transfer sheet 21, that is, the face opposing the cooling surfaces 14a of the battery cells 14, are a total of eleven positioning grooves 21b extending in parallel to the short side. In the present embodiment, two positioning holes 21e and 21e overlap each positioning groove 21b. The lower flanges 15c of the intermediate holders 15 protrude downwardly from the cooling surfaces 14a of the battery cells 14, and these lower flanges 15c are fitted into the positioning grooves 21b. The eleven positioning grooves 21b are given a stepwise difference so that a width W1 is small in an area where the thickness of the heat transfer sheet 21 is large (middle part in the long side direction) and a width W2 is large in an area where the thickness of the heat transfer sheet 21 is small (opposite end parts in the long side direction).

Formed on the upper face of the heat transfer sheet 21 are a total of twelve first air vent grooves 21c along the middle part of the cooling surfaces 14a of the battery cells 14. Therefore, the eleven positioning grooves 21b and the twelve first air vent grooves 21c are formed in turn and in parallel to each other. Furthermore, formed on a lower face of the heat transfer sheet 21 are a total of twenty-four paired second air vent grooves 21d along intermediate positions with respect to the positioning grooves 21b and the first air vent grooves 21c. Two second air vent grooves 21d and 21d oppose the cooling surface 14a of one battery cell 14, and positions of the second air vent grooves 21d are displaced in the long side direction so as not to overlap the positions of the positioning grooves 21b and the positions of the first air vent grooves 21c. The cross-sectional area of the second air vent grooves 21d is set so as to be larger than the cross-sectional area of the first air vent grooves 21c.

Opposite end parts of the positioning grooves 21b, the first air vent grooves 21c, and the second air vent grooves 21d extend to and open on the pair of long sides of the heat transfer sheet 21.

Formed at lower ends of the intermediate holders 15 and the end holders 16 and 16 along the entire peripheries are projecting wall portions 15d, 16c, 16c extending downwardly from the cooling surfaces 14a of the battery cells 14 and protruding so as to turn in toward the cooling surfaces 14a. These projecting wall portions 15d, 16c, 16c are formed so as to surround the outer periphery of the heat transfer sheet 21 across a small gap α (see FIG. 12 to FIG. 14), and the height to which they downwardly protrude from the cooling surfaces 14a is set so as to be smaller than the thickness of the heat transfer sheet 21.

Figure 11:
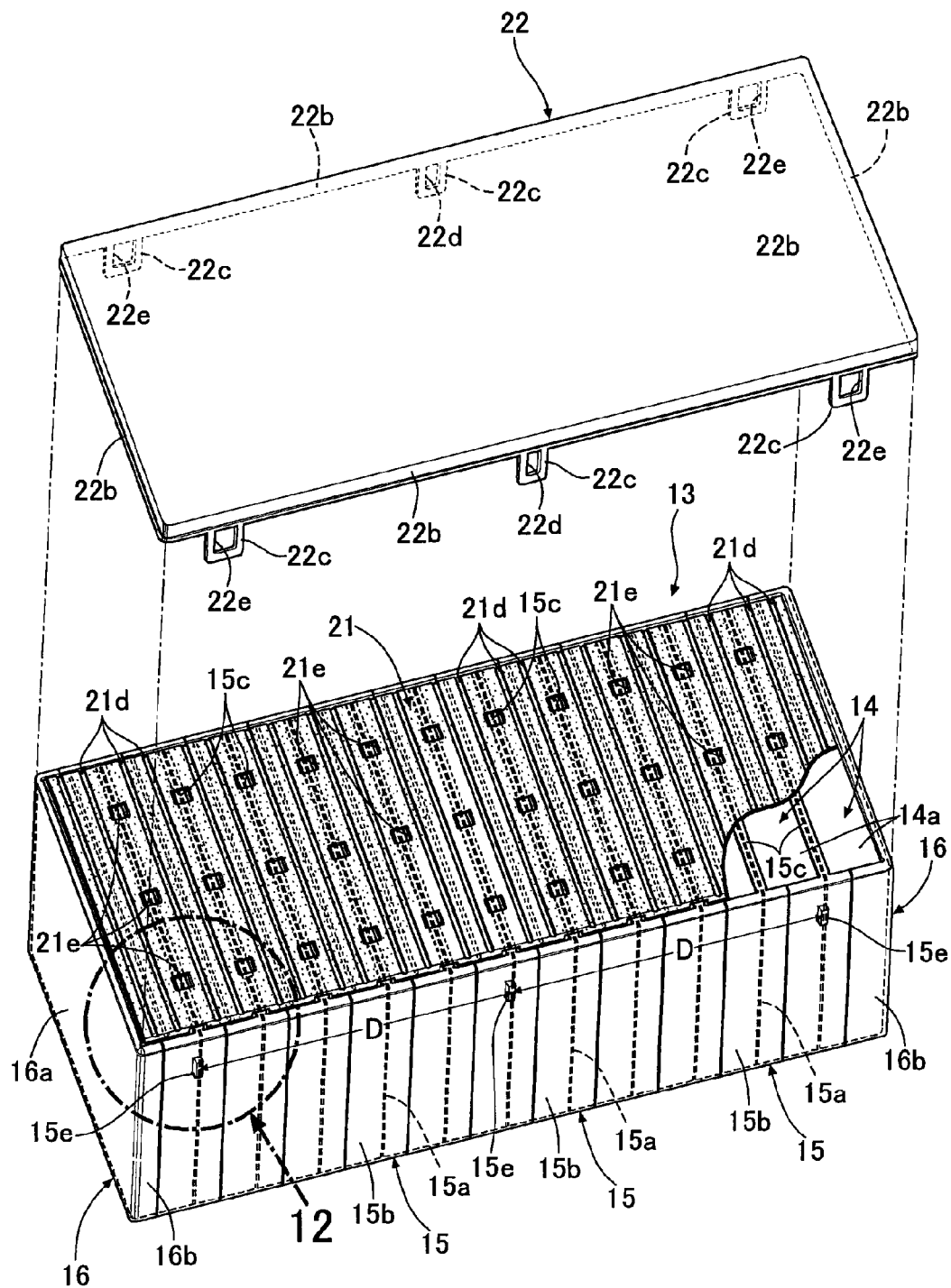
FIG. 11 is a perspective view of the battery module in an upside down state. (fourth embodiment)
Figure 16:
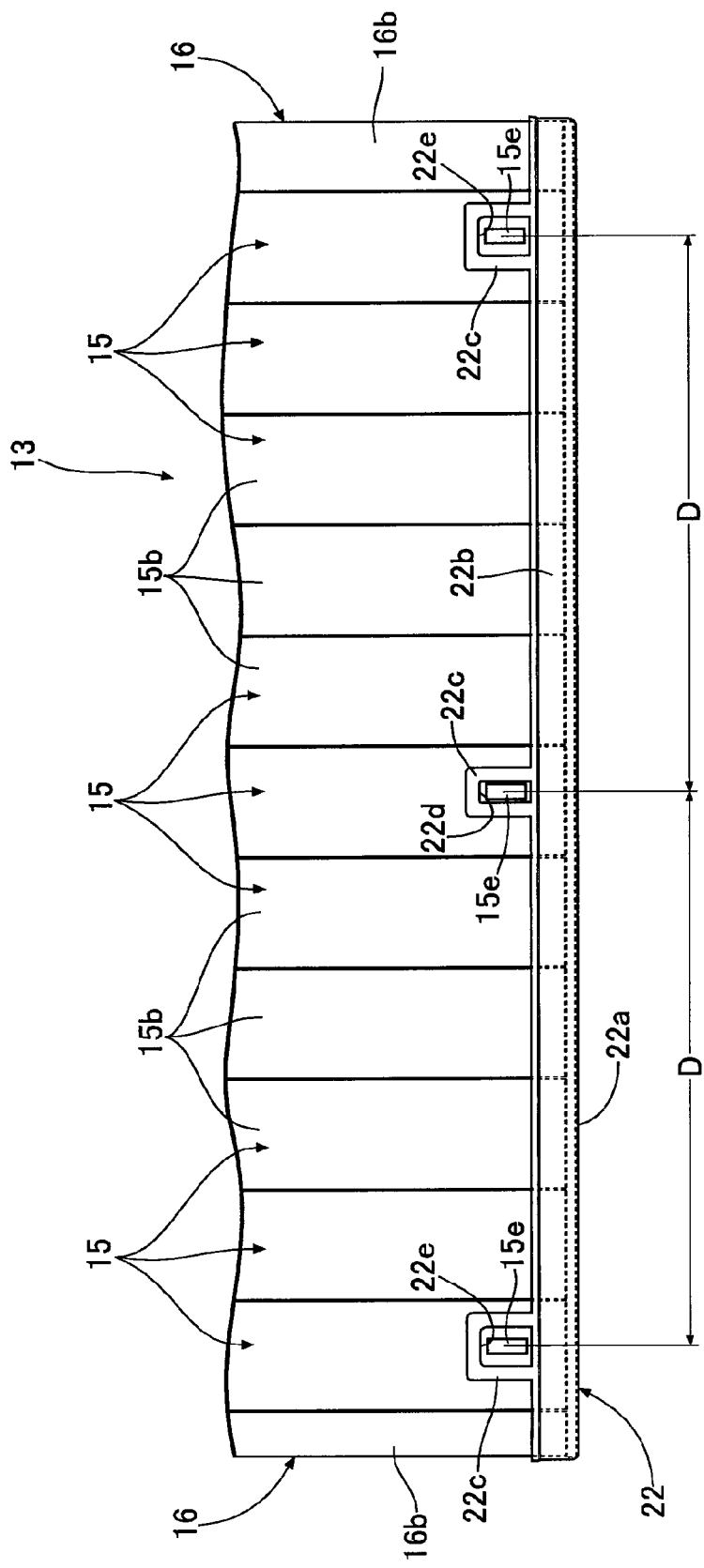
FIG. 16 is a view in the direction of arrow 16 in FIG. 10. (fourth embodiment)

As shown in FIG. 11 and FIG. 16, three latching portions 22c are projectingly provided at the upper edge of each of side wall portions 22b and 22b corresponding to the pair of long sides of the insulating sheet 22, latching holes 22d and 22d having a short length in the long side direction are formed in two middle latching portions 22c and 22c, and latching holes 22e having a long length in the long side direction are formed in four latching portions 22c at opposite ends. On the other hand, latching projections 15e are projectingly provided on opposite side faces of three intermediate holders 15 corresponding to the positions of the latching portions 22c, the latching projections 15e being capable of engaging with the latching holes 22d, 22d, 22e of the insulating sheet 22.

The operation of the embodiment of the present invention having the above arrangement is now explained.

As shown in FIG. 11, after assembly of the two integrated battery modules 13 and 13 is completed, the heat transfer sheet 21 is positioned on the cooling surfaces 14a of the battery cells 14 of each battery module 13 and affixed to the cooling surfaces 14a by utilizing its tackiness. In this process, if the heat transfer sheet 21 is affixed to a position by mistake, when it is pulled away, there is a possibility that the flexible heat transfer sheet 21 will be damaged, and it is therefore necessary to affix the heat transfer sheet 21 to the correct position at the first attempt.

Figure 12:
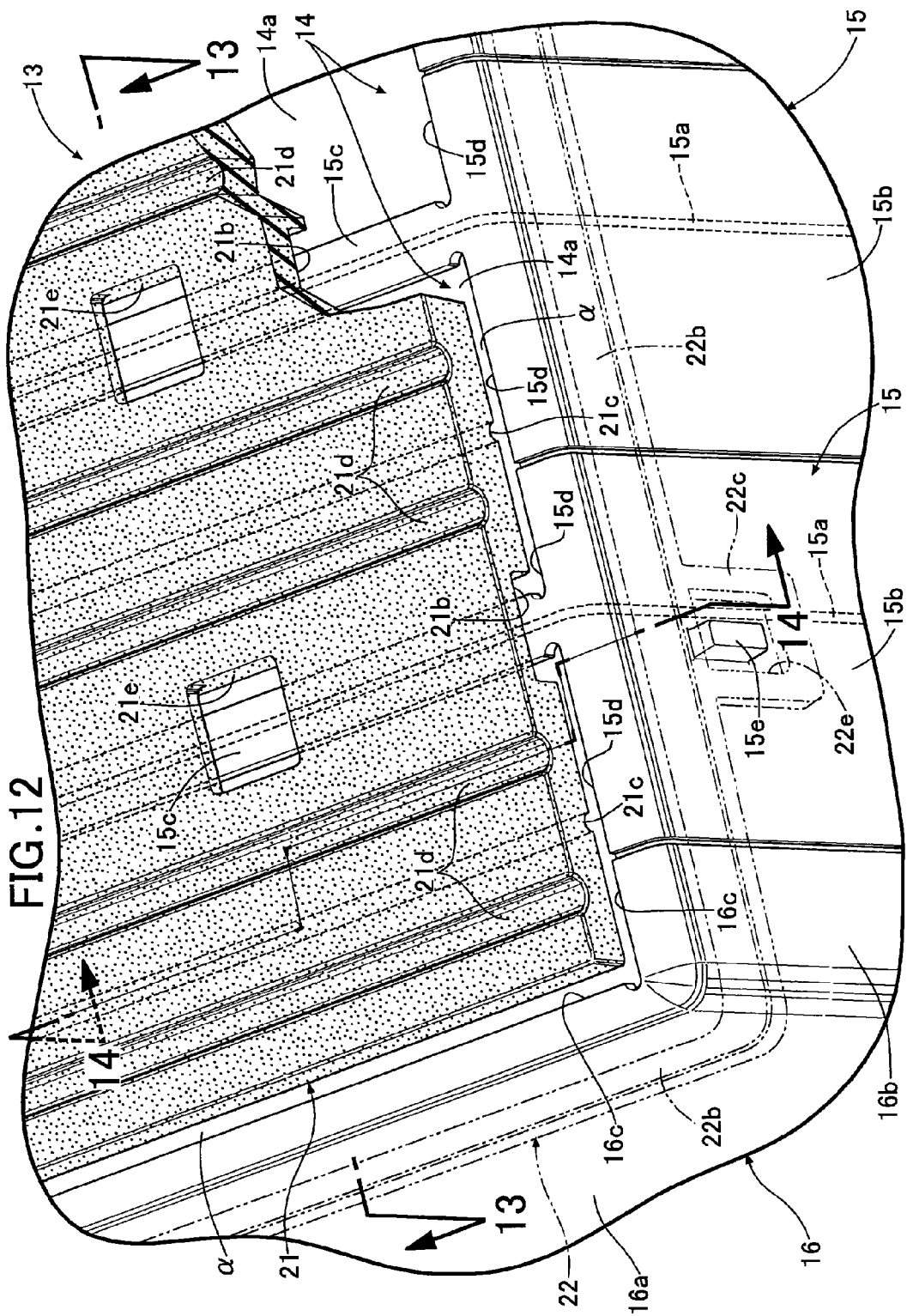
FIG. 12 is an enlarged view of part 12 in FIG. 11. (fourth embodiment)

Because of this, while viewing, through the positioning holes 21e of the heat transfer sheet 21, the cooling surfaces 14a of the battery cells 14, that is, the lower flanges 15c of the intermediate holders 15 exposed on the cooling surfaces 14a of the battery module 13, a worker positions and adheres the heat transfer sheet 21 to the cooling surfaces 14a so that the lower flanges 15c are positioned in the middle part of the positioning holes 21e (see FIG. 12). Since a plurality of positioning holes 21e are provided and distributed over the entire cooling surfaces 14a, the precision of positioning of the heat transfer sheet 21 is very high. In this process, since the width of the lower flange 15c is smaller than the width of the positioning holes 21e and 21e, opposite edges of the lower flange 15c can be viewed through the positioning holes 21e and 21e, thereby further enhancing the precision of positioning of the heat transfer sheet 21.

Figure 13:
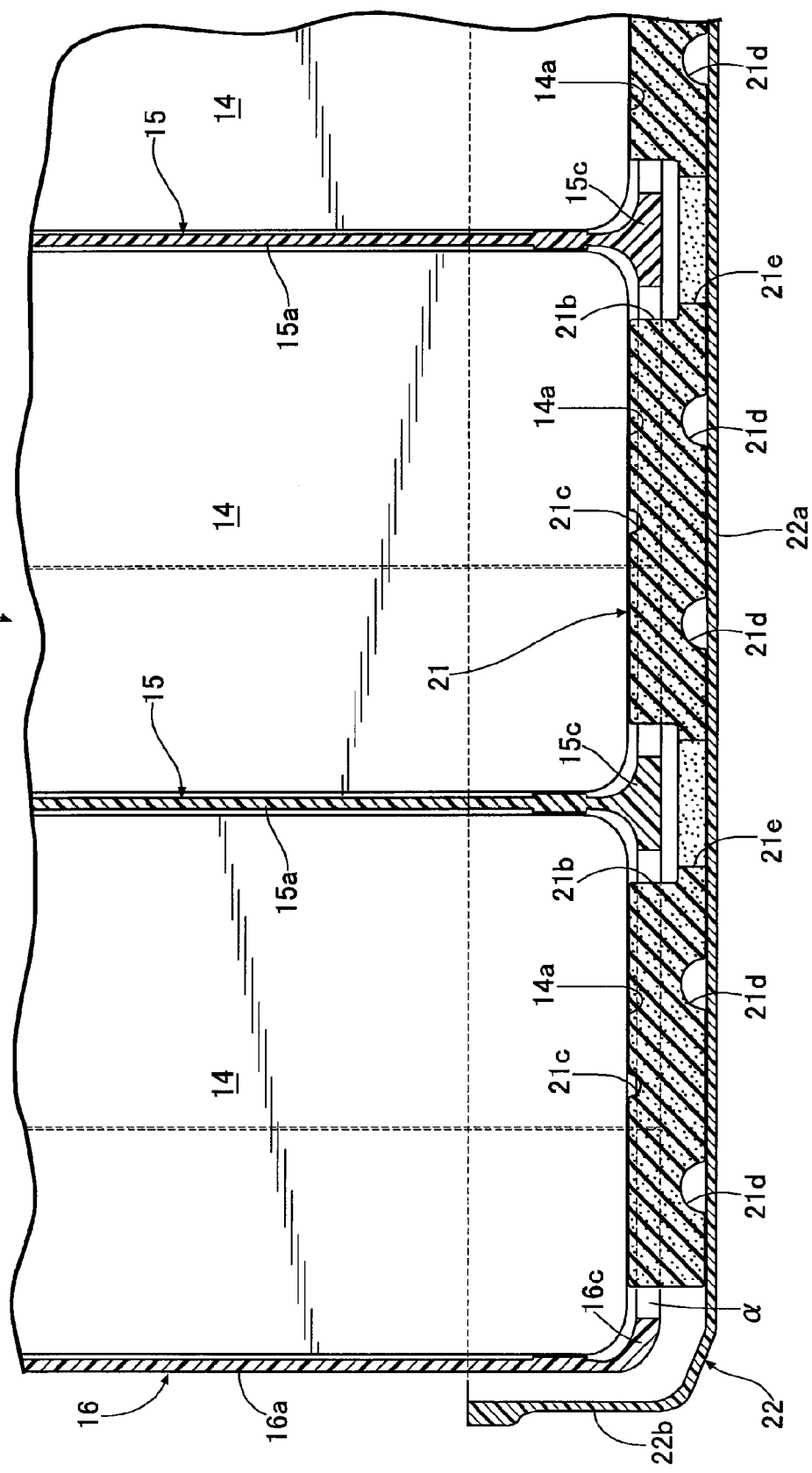
FIG. 13 is a sectional view along line 13-13 in FIG. 12. (fourth embodiment)
Figure 14:
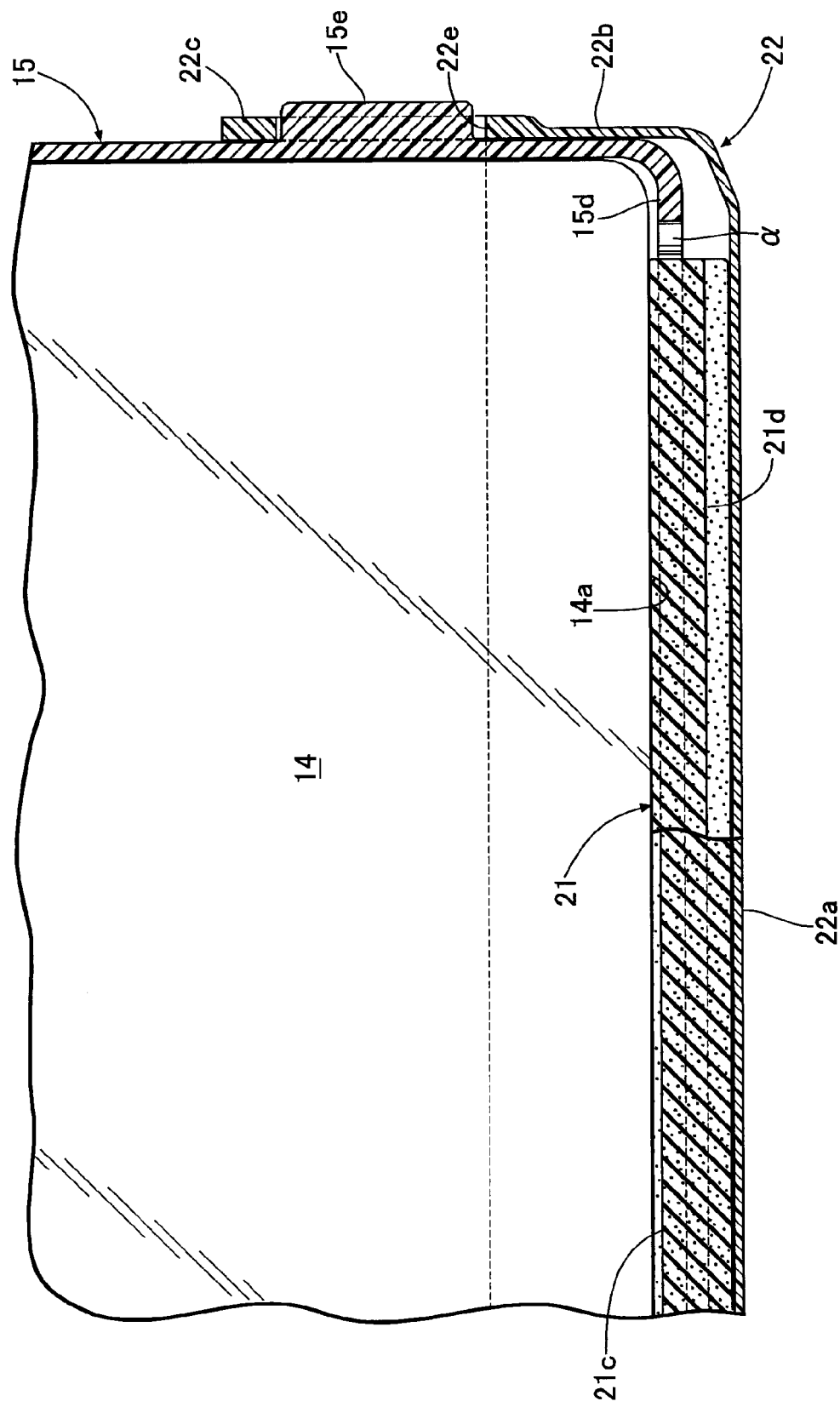
FIG. 14 is a sectional view along line 14-14 in FIG. 12. (fourth embodiment)

As is clear from FIG. 12 to FIG. 14, when the heat transfer sheet 21 is affixed, there is interference with the lower flanges 15c of the intermediate holders 15 protruding from the cooling surfaces 14a of the battery module 13, but it becomes possible, by fitting the lower flanges 15c into the positioning grooves 21b formed in the upper face of the heat transfer sheet 21, to affix the heat transfer sheet 21 without problems. In this process, the heat transfer sheet 21 is physically positioned by fitting the positioning grooves 21b and the lower flanges 15c to each other, thus further improving the precision of positioning. Furthermore, since, in a state in which the heat transfer sheet 21 is affixed, the gap α is formed between the outer periphery of the heat transfer sheet 21 and the projecting wall portions 15d, 16c, 16c of the intermediate holders 15 and the end holders 16 and 16 of the battery module 13, even if the position at which the heat transfer sheet 21 is affixed is slightly displaced, the heat transfer sheet 21 does not interfere with the projecting wall portions 15d, 16c, 16c.

Moreover, since the corners of the positioning holes 21e are rounded, even if the position at which the heat transfer sheet 21 is affixed is displaced and it needs to be re-affixed, it is possible to avoid a situation in which stress is concentrated at the corners of the positioning holes 21e and the heat transfer sheet 21 is torn.

When the heat transfer sheet 21 is affixed to the cooling surfaces 14a of the battery module 13, if air is trapped between the upper face of the heat transfer sheet 21 and the cooling surfaces 14a of the battery module 13, the heat transfer sheet 21 cannot make intimate contact with the cooling surfaces 14a via the air portion, and there is a possibility that the air will form a heat insulating layer to thus degrade the thermal conductivity. However, since the plurality of first air vent grooves 21c are provided on the upper face of the heat transfer sheet 21, any trapped air is discharged to the outside via the first air vent grooves 21c, thus putting the heat transfer sheet 21 in intimate contact with the cooling surfaces 14a and thereby enhancing the thermal conductivity. In this arrangement, needless to say the positioning grooves 21b also function as air vent grooves.

Furthermore, since the heat transfer sheet 21 includes a large number of first air vent grooves 21c and second air vent grooves 21d, it can easily be compressed, the reaction force generated when it attempts to recover its original shape decreases, the load acting on the mounting flanges 17a of the end plates 17 also decreases, and it is possible to prevent the mounting flanges 17a from being broken.

As described above, when the heat transfer sheet 21 is affixed to the cooling surface 14a of the battery module 13, as shown in FIG. 9, FIG. 11 and FIG. 12, a lower part of the battery module 13 is fitted to the tray-shaped insulating sheet 22, and the latching holes 22d, 22d, and 22e of the six latching portions 22c of the insulating sheet 22 are latched onto the six latching projections 15e of the side flanges 15b of the three intermediate holders 15, thus carrying out integration so that the insulating sheet 22 does not fall off from the battery module 13. The operation of engaging the latching holes 22d, 22d, and 22e with the latching projections 15e is easy since the insulating sheet 22 is thin and freely deformable.

Since the battery module 13 is formed by stacking twelve battery cells 14, it is not possible to avoid variation occurring in a gap D between the six latching projections 15e on the sides of the intermediate holders 15 (see FIG. 11 and FIG. 16) due to tolerances accumulating. However, after the two latching holes 22d and 22d in the middle in the long side direction of the insulating sheet 22 are engaged with the two latching projections 15e and 15e in the middle in the long side direction of the battery module 13, when the four latching holes 22e at opposite ends in the long side direction of the insulating sheet 22 are engaged with the four latching projections 15e at opposite ends in the long side direction of the battery module 13, since the width of the four latching holes 22e at opposite ends in the long side direction is set so as to be larger than the width of the corresponding four latching projections 15e, even if there is a variation in the gap between the latching projections 15e, the operation of engaging the latching holes 22d, 22d, 22e with the latching projections 15e can be carried out smoothly.

In the present embodiment, it is possible, by positioning the insulating sheet 22 with the two latching holes 22d and 22d in the middle in the long side direction as a reference, to disperse the cumulative tolerance in the thickness of the battery cells 14 in two directions, thereby minimizing displacement between the four latching holes 22e at opposite ends in the long side direction and the corresponding four latching projections 15e. If the insulating sheet 22 were to be positioned with the two latching holes 22e and 22e at one end in the long side direction as a reference, displacement between the two latching holes 22e and 22e at the other end in the long side direction and the corresponding two latching projections 15e and 15e would increase to twice that of the embodiment.

Figure 17:
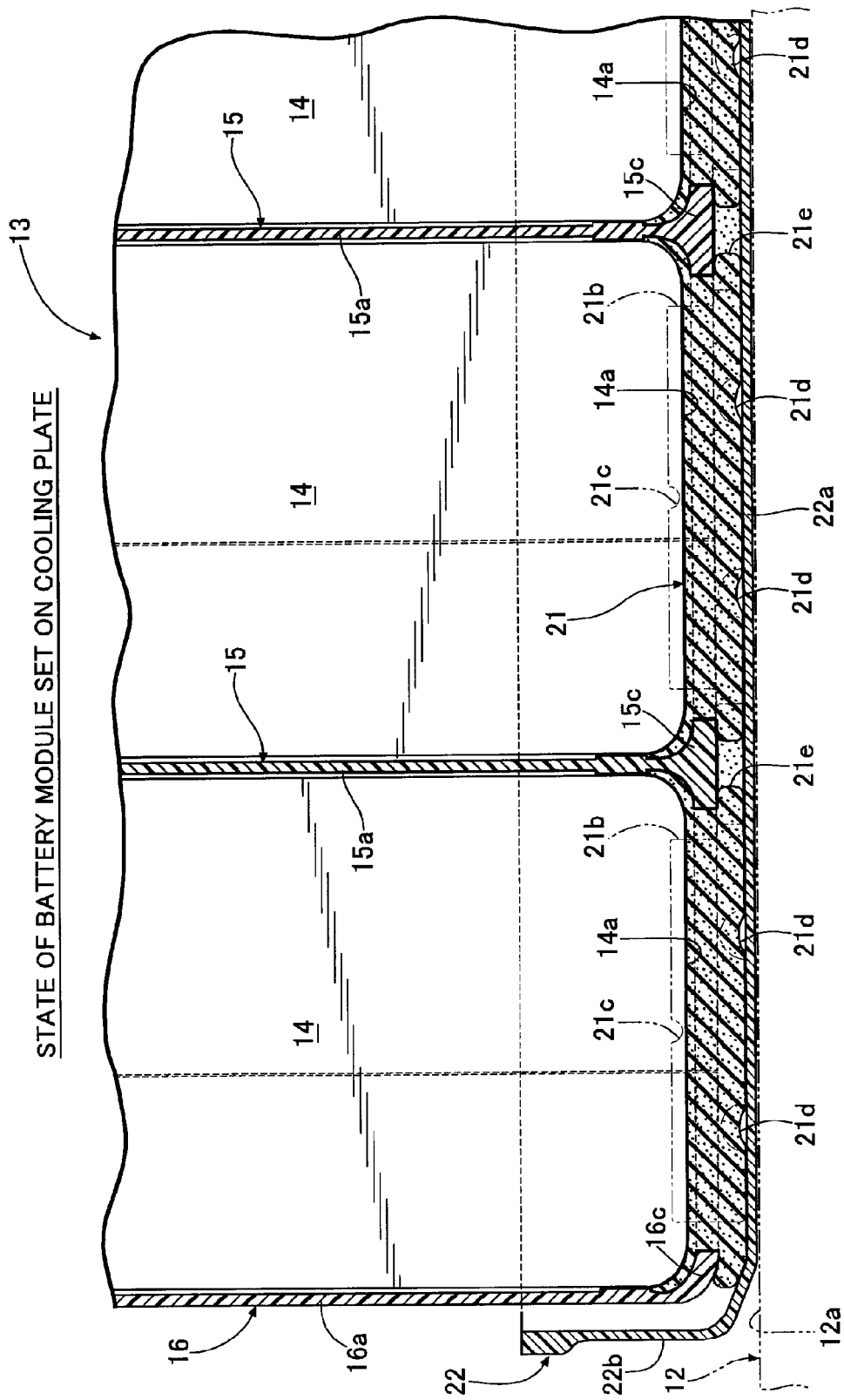
FIG. 17 is a diagram, corresponding to FIG. 13, for explaining the operation. (fourth embodiment)
Figure 18:
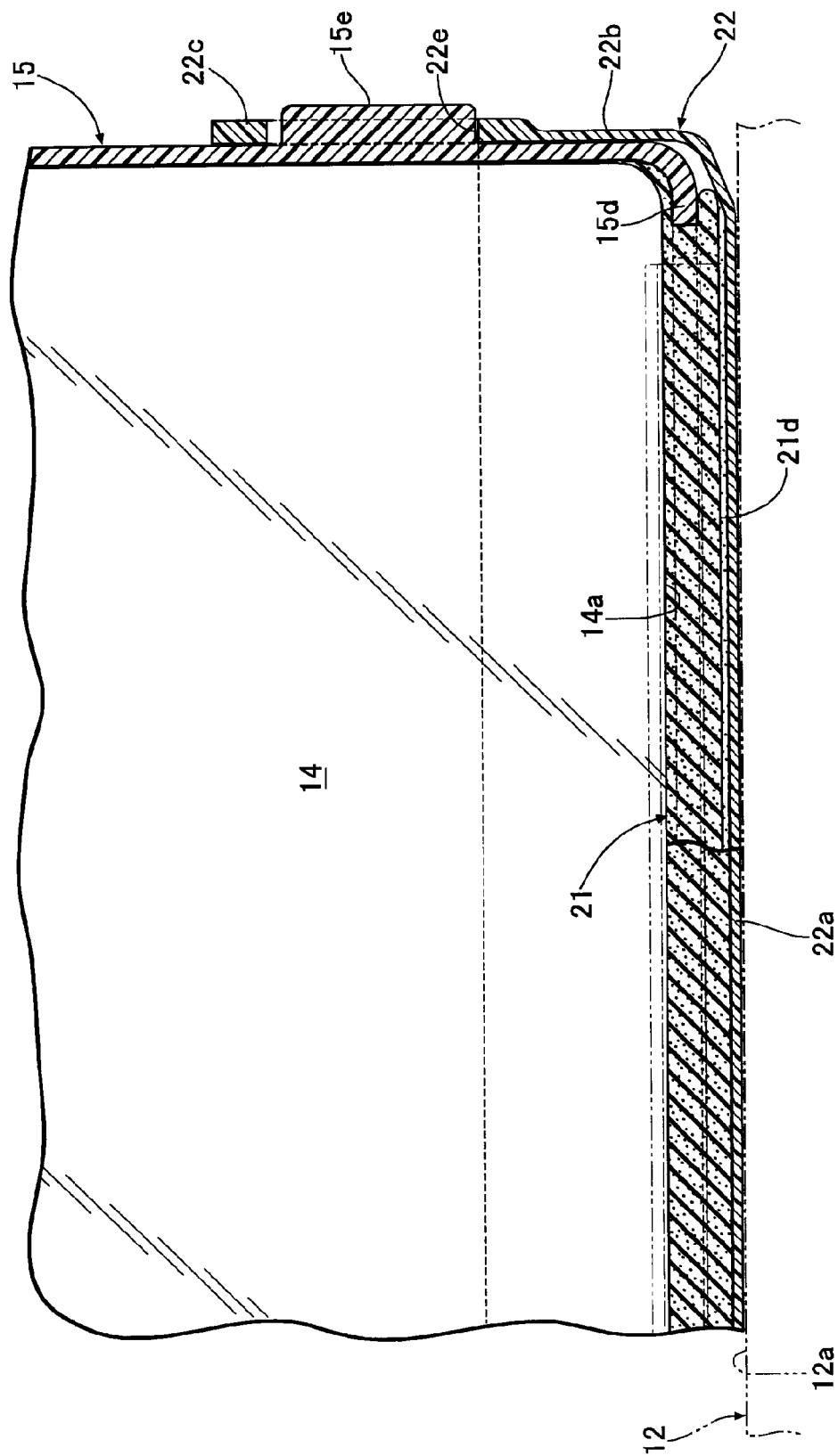
FIG. 18 is a diagram, corresponding to FIG. 14, for explaining the operation. (fourth embodiment)

When the insulating sheet 22 is fitted to the battery module 13 as described above, as shown in FIG. 9, the battery module 13 is placed on the upper wall portion 12a of the cooling plate 12, and secured to the mounting bosses 12d of the cooling plate 12 by means of the bolts 23 extending through the mounting flanges 17a of the end plates 17. As a result, as shown in FIG. 17 and FIG. 18, the heat transfer sheet 21 is subjected to the weight of the battery module 13, the heat transfer sheet 21 is compressed and squashed in the vertical direction, any gap between the upper face of the heat transfer sheet 21 and the cooling surfaces 14a of the battery module 13 and any gap between the lower face of the heat transfer sheet 21 and the upper wall portion 12a of the cooling plate 12 disappear, and heat transfer from the battery module 13 to the cooling plate 12 is carried out efficiently, thus improving the performance in cooling the battery module 13.

Although the bottom wall portion 22a of the insulating sheet 22 is present between the lower face of the heat transfer sheet 21 and the upper wall portion 12a of the cooling plate 12, since the insulating sheet 22 is made of a very thin synthetic resin and is easily deformable, the presence of the insulating sheet 22 does not cause a gap to occur that would interfere with heat transfer.

Furthermore, if air were to be trapped between the lower face of the heat transfer sheet 21 and the upper wall portion 12a of the cooling plate 12, strictly speaking between the lower face of the heat transfer sheet 21 and the upper face of the insulating sheet 22, there is a possibility that the air would prevent the heat transfer sheet 21 from coming into intimate contact with the upper wall portion 12a of the cooling plate 12 and the air would function as a heat insulator layer to thus degrade the thermal conductivity. However, since the plurality of second air vent grooves 21d are provided on the lower face of the heat transfer sheet 21, trapped air is discharged to the outside via the second air vent grooves 21d, thus putting the heat transfer sheet 21 in intimate contact with the upper wall portion 12a of the cooling plate 12 and enhancing the thermal conductivity.

When the heat transfer sheet 21 is compressed and squashed in the vertical direction, the outer periphery of the heat transfer sheet 21 attempts to spread outwardly, but since the projecting wall portions 15d, 16c, 16c of the intermediate holders 15 and the end holders 16 and 16 oppose the outer periphery of the heat transfer sheet 21 across the gap α, the outer periphery of the heat transfer sheet 21 is prevented from protruding outwardly from the outer periphery of the battery module 13 by being blocked by the projecting wall portions 15d, 16c, 16c. The heat transfer sheet 21, which is prevented from spreading outwardly by the projecting wall portions 15d, 16c, 16c, spreads inwardly so as to compress the positioning holes 21e, thus reducing the opening area of the positioning holes 21e.

The positioning holes 21e are inherently provided at positions corresponding to the lower flanges 15c of the intermediate holders 15 so as not to inhibit heat transfer from the cooling surfaces 14a; it is possible, by the opening area of the positioning holes 21e being reduced as described above and the cooling surfaces 14a exposed on opposite sides of the lower flanges 15c of the intermediate holders 15 being covered by the heat transfer sheet 21, to minimize the decrease in thermal conductivity caused by the positioning holes 21e being provided.

In the same way as for the positioning holes 21e, the positioning grooves 21b, the first air vent grooves 21c, and the second air vent grooves 21d are also squashed and eliminated or their cross-sectional areas are decreased, and it is therefore possible to minimize any decrease in thermal conductivity due to the positioning grooves 21b, the first air vent grooves 21c, and the second air vent grooves 21d being provided.

Furthermore, the lower face of the heat transfer sheet 21 abuts against the upper wall portion 12a of the cooling plate 12 via the entire region, but since the upper face of the heat transfer sheet 21 does not abut against the cooling surfaces 14a over the region of the lower flanges 15c of the intermediate holders 15, the heat transfer area of the upper face is smaller than the heat transfer area of the lower face, thus causing the problem that the thermal conductivity decreases. However, in accordance with the present embodiment, since the first air vent grooves 21c of the upper face of the heat transfer sheet 21 have a small cross-sectional area, they are completely eliminated due to squashing deformation, whereas since the second air vent grooves 21d of the lower face of the heat transfer sheet 21 have a small cross-sectional area, they are not completely eliminated by squashing deformation, and the heat transfer area of the lower face decreases by a portion corresponding to the remaining second air vent grooves 21d. As a result, the heat transfer area of the upper face and the heat transfer area of the lower face of the heat transfer sheet 21 are made uniform, thus preventing the thermal conductivity from being degraded.

Furthermore, since the positioning grooves 21b and the first air vent grooves 21c of the upper face of the heat transfer sheet 21 and the second air vent grooves 21d of the lower face of the heat transfer sheet 21 are disposed in parallel so as not to intersect each other when viewed from above and are disposed offset so as not to overlap each other in the vertical direction, it is possible to prevent the thickness of the heat transfer sheet 21 from being locally reduced due to them intersecting or overlapping in the vertical direction.

Moreover, when the heat transfer sheet 21 is squashed, the space between the positioning grooves 21b of the heat transfer sheet 21 and the lower flanges 15c of the intermediate holders 15 is eliminated, but a space may remain there. This is because this space opposes the lower flanges 15c and does not influence the thermal conductivity of the heat transfer sheet 21 and, moreover, the space increases the surface pressure between the upper face of the heat transfer sheet 21 and the cooling surfaces 14a, thereby preventing a gap from occurring in this portion.

Since the cooling plate 12 is a hollow member having defined in its interior the cooling medium passage 12c, when it is subjected to the weight of the battery module 13, the upper wall portion 12a flexes into a downward arc shape, and the distance between the upper wall portion 12a and the middle part in the long side direction of the cooling surfaces 14a of the battery module 13 increases compared with the distance between the upper wall portion 12a and the opposite end parts in the long side direction of the cooling surfaces 14a of the battery module 13. As a result, if the thickness of the heat transfer sheet 21 were uniform, the surface pressure of the middle part in the long side direction of the heat transfer sheet 21 would become low and that part would not fully undergo squashing deformation, a gap would occur in that part, and the thermal conductivity might decrease.

However, in accordance with the present embodiment, as shown in FIG. 15, since the thickness of the heat transfer sheet 21 is large in the middle part in the long side direction and small in the opposite end parts in the long side direction, even if the upper wall portion 12*a* of the cooling plate 12 flexes into a downward arc shape, the entire region of the heat transfer sheet 21 is subjected to an equal surface pressure to thus squash it in the middle part in the long side direction in the same manner as for the opposite end parts in the long side direction, thereby preventing a gap from occurring and avoiding any decrease in the thermal conductivity.

Moreover, when the upper wall portion 12*a* of the cooling plate 12 flexes into a downward arc shape, the middle part in the long side direction of the battery module 13 supported by the upper wall portion 12*a* attempts to flex into a downward arc shape, but since the thickness in the middle part in the long side direction of the heat transfer sheet 21 is large, the reaction force load that pushes the middle part in the long side direction of the battery module 13 upwardly is increased, thus suppressing flexing of the battery module 13. In addition thereto, as shown in FIG. 15, the plurality of positioning grooves 21*b* provided on the upper face of the heat transfer sheet 21 are formed so that those close to the middle part in the long side direction have a smaller groove width, and the middle part in the long side direction of the heat transfer sheet 21 becomes resistant to squashing to thus increase the upward reaction force load, thereby further reliably suppressing flexing of the battery module 13.

The battery cells 14 increase in temperature due to charging or discharging and decrease in temperature due to charging and discharging being stopped; moisture in the air condenses accompanying the decrease in temperature and becomes attached to the surface of the battery module 13. This condensed water flows downward by virtue of gravity, and when it reaches the cooling plate 12, it might generate a ground fault in which an electrode of the battery cells 14 is electrically connected to the cooling plate 12.

However, in accordance with the present embodiment, since the insulating sheet 22 disposed beneath the heat transfer sheet 21 is formed into a tray shape while including the side wall portions 22*b* rising from the outer periphery of the bottom wall portion 22*a*, it is possible to retain condensed water in its interior to thus prevent it from flowing out to the cooling plate 12, thereby reliably preventing the occurrence of a ground fault. Furthermore, since the insulating sheet 22 is formed from a water repellent material, condensed water attached to the surface thereof is in the form of isolated water droplets, thus preventing more effectively an electrical connection between the battery module 13 and the cooling plate 12.

Embodiments of the present invention are explained above, but the present invention may be modified in a variety of ways as long as the modifications do not depart from the spirit and scope thereof.

For example, the shape and sequence of the through holes 21*a* or the recess portions 21*a* of the heat transfer sheet 21 are not limited to those in the embodiments and may be changed as appropriate.

Furthermore, in the embodiments the first air vent groove 21*c* is provided on the upper face of the heat transfer sheet 21 and the second air vent groove 21*d* is provided on the lower face of the heat transfer sheet 21, but either one of the first air vent groove 21*c* and the second air vent groove 21*d* may be provided.

Moreover, the projecting portion of the present invention is not limited to the lower flange 15*c* of the intermediate holders 15 of the embodiments, and any projecting portion may be employed.

Furthermore, the positioning recess portion of the present invention is not limited to the positioning groove 21*b* of the embodiment and need not always have a groove shape.

Moreover, the shape of the positioning hole 21*e* is not limited to that of the embodiments, and as shown as fifth to seventh embodiments in FIG. 19, various shapes may be employed. In any case, it is desirable that corners of the positioning hole 21*e* are rounded so that stress is not concentrated.

The invention claimed is:

1. A structure for securing a battery, in which a linking member provided on a battery is secured to a cooling plate in a state in which a heat transfer sheet that can be deformed by pressure is held between the cooling plate and a cooling surface of the battery,
wherein the heat transfer sheet comprises a recess portion on at least part of a surface thereof, wherein the recess portion:
   (i) comprises a plurality of through holes extending through the heat transfer sheet, the heat transfer sheet has a rectangular shape having long sides and short sides, and a gap between a plurality of through holes disposed along the long sides is larger than a gap between a plurality of through holes disposed along the short sides; or
   (ii) forms an air vent groove extending from one end of the heat transfer sheet toward the other end, and wherein the air vent groove comprises a first air vent groove opposing the cooling surface and a second air vent groove opposing the cooling plate, and the width of the first air vent groove is smaller than the width of the second air vent groove.

2. The structure for securing a battery according to claim 1, wherein an outer periphery of the recess portion has a closed shape.

3. The structure for securing a battery according to claim 2, wherein an insulating sheet is held between the heat transfer sheet and the cooling plate.

4. The structure for securing a battery according to claim 1, wherein the recess portion comprises a plurality of through holes extending through the heat transfer sheet, the heat transfer sheet has a rectangular shape having long sides and short sides, and a gap between a plurality of through holes disposed along the long sides is larger than a gap between a plurality of through holes disposed along the short sides, and the cooling plate is hollow.

5. The structure for securing a battery according to claim 4, wherein the plurality of through holes are disposed in a staggered manner.

6. The structure for securing a battery according to claim 1, wherein the recess portion forms an air vent groove extending from one end of the heat transfer sheet toward the other end, and wherein the air vent groove comprises a first air vent groove opposing the cooling surface and a second air vent groove opposing the cooling plate, and the width of the first air vent groove is smaller than the width of the second air vent groove.

7. The structure for securing a battery according to claim 6, wherein the battery comprises a battery module in which a plurality of battery cells are stacked with a holder held therebetween, the holder comprises a projecting portion protruding from the cooling surface toward the heat transfer sheet, and the heat transfer sheet comprises a positioning recess portion into which the projecting portion is fitted.

8. The structure for securing a battery according to claim 6, wherein the battery comprises a projecting wall portion surrounding a periphery of the cooling surface and protruding toward the cooling plate.

9. The structure for securing a battery according to claim 7, wherein the battery comprises a projecting wall portion surrounding a periphery of the cooling surface and protruding toward the cooling plate.

* * * * *